(12) United States Patent
Shinohara

(10) Patent No.: US 7,940,471 B2
(45) Date of Patent: May 10, 2011

(54) ZOOM LENS, IMAGING APPARATUS AND MOBILE PHONE

(75) Inventor: Yoshikazu Shinohara, Saitama (JP)

(73) Assignee: Fujinon Corporation, Saitama (JP)

( * ) Notice: Subject to any disclaimer, the term of this patent is extended or adjusted under 35 U.S.C. 154(b) by 20 days.

(21) Appl. No.: 12/492,596

(22) Filed: Jun. 26, 2009

(65) Prior Publication Data
US 2010/0020409 A1  Jan. 28, 2010

(30) Foreign Application Priority Data
Jul. 28, 2008  (JP) .............................. P2008-193527

(51) Int. Cl.
*G02B 15/14* (2006.01)
(52) U.S. Cl. ......... 359/684; 359/682; 359/683; 359/686
(58) Field of Classification Search .................. 359/676, 359/680, 682–684, 686, 678, 681; 396/72–88; 348/240.99–240.3
See application file for complete search history.

(56) References Cited

U.S. PATENT DOCUMENTS
| | | | |
|---|---|---|---|
| 7,042,651 B2 * | 5/2006 | Kuba et al. | 359/682 |
| 7,079,328 B2 | 7/2006 | Kuba | |
| 7,307,797 B2 * | 12/2007 | Yoshitsugu et al. | 359/689 |

FOREIGN PATENT DOCUMENTS
| | | |
|---|---|---|
| JP | 2000-131610 A | 5/2000 |
| JP | 2004-205796 A | 7/2004 |

* cited by examiner

*Primary Examiner* — Ricky L Mack
*Assistant Examiner* — Zachary Wilkes
(74) *Attorney, Agent, or Firm* — Birch, Stewart, Kolasch & Birch, LLP

(57) ABSTRACT

A zoom lens includes a first lens group having a negative refractive power, a second lens group including a prism which has no refractive power and deflects an optical path, a third lens group that has a positive refractive power and is moved during zooming, a fourth lens group that has a negative refractive power and is moved during zooming, and a fifth lens group having a positive refractive power arranged in this order from an object side. A zoom group including the third positive lens group and the fourth negative lens group, not a fixed positive lens group, is provided on the rear side of the prism. The first lens group includes two negative lenses.

12 Claims, 23 Drawing Sheets

EXAMPLE 1

EXAMPLE 1

EXAMPLE 2

EXAMPLE 3

EXAMPLE 4

EXAMPLE 5

EXAMPLE 6

EXAMPLE 1

FIG.8A

| EXAMPLE 1 BASIC LENS DATA ||||||
|---|---|---|---|---|---|
| | Si (SURFACE NUMBER) | Ri (CURVATURE RADIUS) | Di (SURFACE SPACING) | Ndi (REFRACTIVE INDEX) | νdj (ABBE NUMBER) |
| G1 | *1 | −8.502 | 0.80 | 1.5176 | 63.5 |
| | *2 | −15.997 | 0.10 | 1.0000 | |
| | 3 | ∞ | 0.60 | 1.7130 | 53.9 |
| | 4 | 10.339 | 1.19 | 1.0000 | |
| G2 | 5 | ∞ | 7.30 | 1.8348 | 42.7 |
| | 6 | ∞ | D6(VARIABLE) | 1.0000 | |
| G3 | *7 | 6.393 | 1.43 | 1.6899 | 53.2 |
| | *8 | −15.546 | 0.38 | 1.0000 | |
| | 9 | −147.771 | 0.98 | 1.4970 | 81.5 |
| | 10 | −40.164 | 0.50 | 1.0000 | |
| | 11 (APERTURE DIAPHRAGM) | | D11(VARIABLE) | 1.0000 | |
| G4 | 12 | 7.785 | 1.30 | 1.4970 | 81.5 |
| | 13 | −14.236 | 0.60 | 1.8467 | 23.8 |
| | 14 | 4.914 | 0.93 | 1.0000 | |
| | *15 | −6.341 | 0.60 | 1.6140 | 25.5 |
| | *16 | −11.086 | D16(VARIABLE) | 1.0000 | |
| G5 | *17 | 43.359 | 2.89 | 1.8035 | 40.4 |
| | *18 | −6.921 | 0.59 | 1.0000 | |
| | 19 | ∞ | 0.30 | 1.5168 | 64.2 |
| | 20 | ∞ | 2.26 | 1.0000 | |

(*:ASPHERIC SURFACE)

FIG.8B

| EXAMPLE 1 VARIABLE SURFACE SPACING DATA ||||
|---|---|---|---|
| | D6 | D11 | D16 |
| WIDE ANGLE END | 9.76 | 0.96 | 1.18 |
| TELEPHOTO END | 1.04 | 1.88 | 8.98 |

FIG.9A

| | EXAMPLE 2 BASIC LENS DATA | | | | |
|---|---|---|---|---|---|
| | Si (SURFACE NUMBER) | Ri (CURVATURE RADIUS) | Di (SURFACE SPACING) | Ndi (REFRACTIVE INDEX) | νdj (ABBE NUMBER) |
| G1 | *1 | −8.549 | 0.80 | 1.5176 | 63.5 |
| | *2 | −16.317 | 0.10 | 1.0000 | |
| | 3 | ∞ | 0.60 | 1.7550 | 52.3 |
| | 4 | 10.776 | 1.13 | 1.0000 | |
| G2 | 5 | ∞ | 7.30 | 1.8348 | 42.7 |
| | 6 | ∞ | D6 (VARIABLE) | 1.0000 | |
| G3 | *7 | 5.946 | 1.45 | 1.6899 | 53.2 |
| | *8 | −24.761 | 0.46 | 1.0000 | |
| | 9 | 35.201 | 1.06 | 1.4970 | 81.5 |
| | 10 | −31.392 | 0.50 | 1.0000 | |
| | 11 (APERTURE DIAPHRAGM) | | D11 (VARIABLE) | 1.0000 | |
| G4 | 12 | 13.846 | 1.24 | 1.4970 | 81.5 |
| | 13 | −10.354 | 0.60 | 1.8467 | 23.8 |
| | 14 | 4.937 | 0.83 | 1.0000 | |
| | *15 | −11.970 | 0.60 | 1.6140 | 25.5 |
| | *16 | −18.845 | D16 (VARIABLE) | 1.0000 | |
| G5 | *17 | 39.592 | 2.83 | 1.8035 | 40.4 |
| | *18 | −7.247 | 0.59 | 1.0000 | |
| | 19 | ∞ | 0.30 | 1.5168 | 64.2 |
| | 20 | ∞ | 2.37 | 1.0000 | |

(∗:ASPHERIC SURFACE)

FIG.9B

| EXAMPLE 2 VARIABLE SURFACE SPACING DATA | | | |
|---|---|---|---|
| | D6 | D11 | D16 |
| WIDE ANGLE END | 9.76 | 0.91 | 1.18 |
| TELEPHOTO END | 1.04 | 1.75 | 9.07 |

FIG.10A

| | EXAMPLE 3 BASIC LENS DATA | | | | |
|---|---|---|---|---|---|
| | Si (SURFACE NUMBER) | Ri (CURVATURE RADIUS) | Di (SURFACE SPACING) | Ndi (REFRACTIVE INDEX) | νdj (ABBE NUMBER) |
| G1 | *1 | −10.236 | 0.80 | 1.5176 | 63.5 |
| G1 | *2 | −19.345 | 0.10 | 1.0000 | |
| G1 | 3 | ∞ | 0.60 | 1.6204 | 60.3 |
| G1 | 4 | 7.607 | 1.52 | 1.0000 | |
| G2 | 5 | ∞ | 7.30 | 1.8348 | 42.7 |
| G2 | 6 | ∞ | D6 (VARIABLE) | 1.0000 | |
| G3 | *7 | 6.097 | 1.55 | 1.5096 | 56.5 |
| G3 | *8 | −12.302 | 0.43 | 1.0000 | |
| G3 | 9 | −107.020 | 1.14 | 1.5163 | 64.1 |
| G3 | 10 | −11.159 | 0.50 | 1.0000 | |
| | 11 (APERTURE DIAPHRAGM) | | D11 (VARIABLE) | 1.0000 | |
| G4 | 12 | 9.359 | 1.31 | 1.4970 | 81.5 |
| G4 | 13 | −11.514 | 0.60 | 1.8467 | 23.8 |
| G4 | 14 | 4.958 | 1.22 | 1.0000 | |
| G4 | *15 | −2.879 | 0.60 | 1.6140 | 25.5 |
| G4 | *16 | −3.625 | D16 (VARIABLE) | 1.0000 | |
| G5 | *17 | 26.435 | 3.09 | 1.8035 | 40.4 |
| G5 | *18 | −8.028 | 0.59 | 1.0000 | |
| | 19 | ∞ | 0.30 | 1.5168 | 64.2 |
| | 20 | ∞ | 2.34 | 1.0000 | |

(*:ASPHERIC SURFACE)

FIG.10B

| EXAMPLE 3 VARIABLE SURFACE SPACING DATA | | | |
|---|---|---|---|
| | D6 | D11 | D16 |
| WIDE ANGLE END | 9.76 | 1.40 | 1.37 |
| TELEPHOTO END | 0.76 | 2.65 | 9.12 |

FIG.11A

| | EXAMPLE 4 BASIC LENS DATA | | | | |
|---|---|---|---|---|---|
| | Si (SURFACE NUMBER) | Ri (CURVATURE RADIUS) | Di (SURFACE SPACING) | Ndi (REFRACTIVE INDEX) | νdj (ABBE NUMBER) |
| G1 | *1 | -8.979 | 0.80 | 1.5176 | 63.5 |
| G1 | *2 | -14.499 | 0.46 | 1.0000 | |
| G1 | 3 | -605.921 | 0.60 | 1.6204 | 60.3 |
| G1 | 4 | 7.895 | 1.49 | 1.0000 | |
| G2 | 5 | ∞ | 7.30 | 1.8348 | 42.7 |
| G2 | 6 | ∞ | D6 (VARIABLE) | 1.0000 | |
| G3 | *7 | 6.337 | 1.55 | 1.5096 | 56.5 |
| G3 | *8 | -10.889 | 0.57 | 1.0000 | |
| G3 | 9 | -54.875 | 1.07 | 1.5163 | 64.1 |
| G3 | 10 | -13.301 | 0.50 | 1.0000 | |
| | 11 (APERTURE DIAPHRAGM) | | D11 (VARIABLE) | 1.0000 | |
| G4 | 12 | 6.414 | 1.30 | 1.4970 | 81.5 |
| G4 | 13 | -20.778 | 0.60 | 1.8467 | 23.8 |
| G4 | 14 | 4.542 | 1.24 | 1.0000 | |
| G4 | *15 | -2.395 | 0.60 | 1.6140 | 25.5 |
| G4 | *16 | -3.170 | D16 (VARIABLE) | 1.0000 | |
| G5 | *17 | 23.535 | 3.05 | 1.8035 | 40.4 |
| G5 | *18 | -8.556 | 0.59 | 1.0000 | |
| | 19 | ∞ | 0.30 | 1.5168 | 64.2 |
| | 20 | ∞ | 2.35 | 1.0000 | |

(*:ASPHERIC SURFACE)

FIG.11B

| EXAMPLE 4 VARIABLE SURFACE SPACING DATA | | | |
|---|---|---|---|
| | D6 | D11 | D16 |
| WIDE ANGLE END | 9.76 | 1.32 | 1.17 |
| TELEPHOTO END | 0.71 | 2.69 | 8.85 |

FIG.12A

| | EXAMPLE 5 BASIC LENS DATA | | | | |
|---|---|---|---|---|---|
| | Si (SURFACE NUMBER) | Ri (CURVATURE RADIUS) | Di (SURFACE SPACING) | Ndi (REFRACTIVE INDEX) | νdj (ABBE NUMBER) |
| G1 | *1 | -9.890 | 0.80 | 1.5176 | 63.5 |
| | *2 | -52.226 | 1.53 | 1.0000 | |
| | 3 | -16.647 | 0.60 | 1.5897 | 61.6 |
| | 4 | 27.746 | 0.44 | 1.0000 | |
| G2 | 5 | ∞ | 7.30 | 1.8348 | 42.7 |
| | 6 | ∞ | D6 (VARIABLE) | 1.0000 | |
| G3 | *7 | 5.938 | 1.36 | 1.5096 | 56.5 |
| | *8 | -47.864 | 0.55 | 1.0000 | |
| | 9 | 24.267 | 1.26 | 1.5150 | 64.4 |
| | 10 | -10.681 | 0.50 | 1.0000 | |
| | 11 (APERTURE DIAPHRAGM) | | D11 (VARIABLE) | 1.0000 | |
| G4 | 12 | 7.595 | 1.25 | 1.4970 | 81.5 |
| | 13 | -38.432 | 0.60 | 1.8467 | 23.8 |
| | 14 | 3.645 | 0.72 | 1.0000 | |
| | *15 | -15.427 | 0.60 | 1.6140 | 25.5 |
| | *16 | -26.754 | D16 (VARIABLE) | 1.0000 | |
| G5 | *17 | 25.024 | 3.10 | 1.8035 | 40.4 |
| | *18 | -7.336 | 0.59 | 1.0000 | |
| | 19 | ∞ | 0.30 | 1.5168 | 64.2 |
| | 20 | ∞ | 2.35 | 1.0000 | |

(*:ASPHERIC SURFACE)

FIG.12B

| EXAMPLE 5 VARIABLE SURFACE SPACING DATA | | | |
|---|---|---|---|
| | D6 | D11 | D16 |
| WIDE ANGLE END | 9.76 | 1.45 | 1.57 |
| TELEPHOTO END | 0.81 | 2.76 | 9.21 |

FIG.13A

| EXAMPLE 6 BASIC LENS DATA |||||
|---|---|---|---|---|
| Si (SURFACE NUMBER) | Ri (CURVATURE RADIUS) | Di (SURFACE SPACING) | Ndi (REFRACTIVE INDEX) | νdj (ABBE NUMBER) |
| G1 *1 | −8.340 | 0.80 | 1.5176 | 63.5 |
| *2 | −15.622 | 0.10 | 1.0000 | |
| 3 | ∞ | 0.60 | 1.7550 | 52.3 |
| 4 | 11.401 | 1.11 | 1.0000 | |
| G2 5 | ∞ | 7.30 | 1.8348 | 42.7 |
| 6 | ∞ | D6 (VARIABLE) | 1.0000 | |
| G3 *7 | 5.802 | 1.48 | 1.6899 | 53.2 |
| *8 | −20.938 | 1.68 | 1.0000 | |
| 9 (APERTURE DIAPHRAGM) | | D9 (VARIABLE) | 1.0000 | |
| G4 10 | 8.227 | 1.33 | 1.4970 | 81.5 |
| 11 | −9.751 | 0.60 | 1.8467 | 23.8 |
| 12 | 5.066 | 0.89 | 1.0000 | |
| *13 | −8.797 | 0.60 | 1.6060 | 27.0 |
| *14 | −11.152 | D14 (VARIABLE) | 1.0000 | |
| G5 *15 | 46.071 | 3.01 | 1.8035 | 40.4 |
| *16 | −6.783 | 0.59 | 1.0000 | |
| 17 | ∞ | 0.30 | 1.5168 | 64.2 |
| 18 | ∞ | 2.32 | 1.0000 | |

(*: ASPHERIC SURFACE)

FIG.13B

| EXAMPLE 6 VARIABLE SURFACE SPACING DATA ||||
|---|---|---|---|
| | D6 | D9 | D14 |
| WIDE ANGLE END | 9.76 | 0.97 | 1.18 |
| TELEPHOTO END | 0.88 | 2.11 | 8.92 |

FIG.14

| EXAMPLE 1 ASPHERIC DATA | | | | | |
|---|---|---|---|---|---|
| SURFACE NUMBER | K | A4 | A6 | A8 | A10 |
| 1 | 1.00 | 2.62E-03 | -7.43E-05 | 1.32E-06 | -7.69E-09 |
| 2 | 1.00 | 2.23E-03 | -6.22E-05 | 5.01E-07 | 1.21E-08 |
| 7 | 1.00 | -8.88E-04 | -1.44E-04 | 1.66E-05 | -2.75E-06 |
| 8 | 1.00 | -1.09E-04 | -2.07E-04 | 2.80E-05 | -3.13E-06 |
| 15 | 1.00 | 8.81E-03 | 9.75E-04 | -1.28E-03 | 2.16E-04 |
| 16 | 1.00 | 1.06E-02 | 6.91E-04 | -6.40E-04 | 8.78E-05 |
| 17 | 1.00 | -7.35E-04 | 4.85E-05 | -1.75E-06 | 2.42E-08 |
| 18 | 1.00 | -8.19E-06 | 5.22E-05 | -1.77E-06 | 2.54E-08 |

FIG.15

| EXAMPLE 2 ASPHERIC DATA | | | | | |
|---|---|---|---|---|---|
| SURFACE NUMBER | K | A4 | A6 | A8 | A10 |
| 1 | 1.00 | 2.62E-03 | -7.35E-05 | 1.32E-06 | -7.90E-09 |
| 2 | 1.00 | 2.20E-03 | -5.86E-05 | 4.33E-07 | 1.26E-08 |
| 7 | 1.00 | -3.31E-04 | -4.72E-05 | 9.69E-06 | -1.81E-07 |
| 8 | 1.00 | 6.98E-04 | -1.44E-04 | 3.49E-05 | -1.96E-06 |
| 15 | 1.00 | 5.42E-03 | 5.81E-04 | -9.86E-04 | 1.65E-04 |
| 16 | 1.00 | 7.41E-03 | 4.03E-04 | -5.15E-04 | 7.31E-05 |
| 17 | 1.00 | -7.22E-04 | 5.77E-05 | -2.83E-06 | 3.93E-08 |
| 18 | 1.00 | -9.36E-06 | 5.24E-05 | -2.24E-06 | 2.80E-08 |

FIG.16

| EXAMPLE 3 ASPHERIC DATA | | | | | |
|---|---|---|---|---|---|
| SURFACE NUMBER | K | A4 | A6 | A8 | A10 |
| 1 | 1.00 | 2.25E-03 | -6.19E-05 | 1.00E-06 | -5.35E-09 |
| 2 | 1.00 | 1.88E-03 | -5.47E-05 | 5.57E-07 | 5.30E-09 |
| 7 | 1.00 | -1.51E-03 | -1.90E-04 | 1.97E-05 | -4.16E-06 |
| 8 | 1.00 | -1.99E-04 | -2.17E-04 | 2.20E-05 | -3.60E-06 |
| 15 | 1.00 | 1.32E-02 | 4.45E-03 | -1.83E-03 | 2.26E-04 |
| 16 | 1.00 | 1.12E-02 | 2.82E-03 | -8.31E-04 | 7.64E-05 |
| 17 | 1.00 | -5.05E-04 | 3.32E-05 | -1.70E-06 | 2.46E-08 |
| 18 | 1.00 | -2.17E-04 | 4.46E-05 | -1.71E-06 | 2.14E-08 |

FIG.17

| EXAMPLE 4 ASPHERIC DATA | | | | | |
|---|---|---|---|---|---|
| SURFACE NUMBER | K | A4 | A6 | A8 | A10 |
| 1 | 1.00 | 3.04E-03 | -7.67E-05 | 1.31E-06 | -7.05E-09 |
| 2 | 1.00 | 2.68E-03 | -5.56E-05 | 1.87E-07 | 1.84E-08 |
| 7 | 1.00 | -1.61E-03 | -2.05E-04 | 2.17E-05 | -5.06E-06 |
| 8 | 1.00 | -5.31E-04 | -2.17E-04 | 1.82E-05 | -3.63E-06 |
| 15 | 1.00 | 1.91E-02 | 4.98E-03 | -1.80E-03 | 2.51E-04 |
| 16 | 1.00 | 1.40E-02 | 2.99E-03 | -8.15E-04 | 7.62E-05 |
| 17 | 1.00 | -6.76E-04 | 4.44E-05 | -2.14E-06 | 2.81E-08 |
| 18 | 1.00 | -5.57E-04 | 5.87E-05 | -2.10E-06 | 2.31E-08 |

FIG.18

| EXAMPLE 5 ASPHERIC DATA | | | | | |
|---|---|---|---|---|---|
| SURFACE NUMBER | K | A4 | A6 | A8 | A10 |
| 1 | 1.00 | 3.01E-03 | -8.58E-05 | 1.58E-06 | -1.09E-08 |
| 2 | 1.00 | 2.61E-03 | -4.35E-05 | -7.61E-07 | 4.46E-08 |
| 7 | 1.00 | -4.77E-04 | 2.93E-06 | 6.09E-06 | -8.69E-07 |
| 8 | 1.00 | 1.07E-03 | -4.37E-05 | 1.85E-05 | -1.87E-06 |
| 15 | 1.00 | 4.47E-03 | -1.28E-03 | -1.56E-04 | 3.37E-05 |
| 16 | 1.00 | 4.66E-03 | -8.64E-04 | -1.18E-04 | 2.19E-05 |
| 17 | 1.00 | -3.91E-04 | 2.62E-05 | -1.59E-06 | 2.77E-08 |
| 18 | 1.00 | 3.43E-04 | 3.26E-05 | -1.78E-06 | 2.99E-08 |

FIG.19

| EXAMPLE 6 ASPHERIC DATA | | | | | |
|---|---|---|---|---|---|
| SURFACE NUMBER | K | A4 | A6 | A8 | A10 |
| 1 | 1.00 | 2.62E-03 | -7.33E-05 | 1.32E-06 | -7.71E-09 |
| 2 | 1.00 | 2.18E-03 | -5.87E-05 | 4.21E-07 | 1.27E-08 |
| 7 | 1.00 | -2.10E-04 | -2.91E-05 | 7.93E-06 | 3.23E-07 |
| 8 | 1.00 | 7.95E-04 | -1.14E-04 | 3.07E-05 | -1.23E-06 |
| 13 | 1.00 | 6.36E-03 | 4.43E-04 | -9.29E-04 | 1.59E-04 |
| 14 | 1.00 | 7.87E-03 | 4.91E-04 | -5.11E-04 | 7.10E-05 |
| 15 | 1.00 | -9.63E-04 | 6.47E-05 | -3.84E-06 | 7.03E-08 |
| 16 | 1.00 | -1.99E-04 | 6.91E-05 | -3.39E-06 | 5.58E-08 |

FIG.20

| VALUES RELATED TO CONDITIONAL EXPRESSION | | | | | | | |
|---|---|---|---|---|---|---|---|
| CONDITIONAL EXPRESSION | EXPRESSION NUMBER | EXAMPLE | | | | | |
| | | 1 | 2 | 3 | 4 | 5 | 6 |
| $0 < f_{12}/f_{11} < 1.0$ | (1) | 0.40 | 0.40 | 0.28 | 0.24 | 0.74 | 0.42 |
| $-1.5 < f_3/f_4 < -0.5$ | (2) | -1.03 | -1.11 | -1.07 | -1.07 | -1.16 | -0.96 |
| $0.7 < H_{img}/f_w$ | (3) | 0.76 | 0.75 | 0.75 | 0.75 | 0.75 | 0.75 |
| $50 < \nu G3$ | (4) | 67.4 | 67.4 | 60.3 | 60.3 | 60.3 | 53.2 |

EXAMPLE 1 WIDE ANGLE END

FNO. =2.90
F-LINE
d-LINE
C-LINE
-0.1mm  0.1mm
SPHERICAL ABERRATION $\omega$=40.1°
—— SAGITTAL
······ TANGENTIAL
-0.1mm  0.1mm
ASTIGMATISM $\omega$=40.1°
-5%  5%
DISTORTION

EXAMPLE 1 TELEPHOTO END

FNO. =5.57
C-LINE
d-LINE
F-LINE
-0.1mm  0.1mm
SPHERICAL ABERRATION $\omega$=16.0°
—— SAGITTAL
······ TANGENTIAL
-0.1mm  0.1mm
ASTIGMATISM $\omega$=16.0°
-5%  5%
DISTORTION

EXAMPLE 2 WIDE ANGLE END

SPHERICAL ABERRATION

ASTIGMATISM

DISTORTION

EXAMPLE 2 TELEPHOTO END

SPHERICAL ABERRATION

ASTIGMATISM

DISTORTION

EXAMPLE 3 WIDE ANGLE END

SPHERICAL ABERRATION

ASTIGMATISM

DISTORTION

EXAMPLE 3 TELEPHOTO END

SPHERICAL ABERRATION

ASTIGMATISM

DISTORTION

EXAMPLE 4 WIDE ANGLE END

FNO.=2.90
SPHERICAL ABERRATION

ω=38.0°
ASTIGMATISM

ω=38.0°
DISTORTION

EXAMPLE 4 TELEPHOTO END

FNO.=5.51
SPHERICAL ABERRATION

ω=15.8°
ASTIGMATISM

ω=15.8°
DISTORTION

EXAMPLE 5 WIDE ANGLE END

SPHERICAL ABERRATION

ASTIGMATISM

DISTORTION

EXAMPLE 5 TELEPHOTO END

SPHERICAL ABERRATION

ASTIGMATISM

DISTORTION

EXAMPLE 6 WIDE ANGLE END

EXAMPLE 6 TELEPHOTO END

US 7,940,471 B2

ZOOM LENS, IMAGING APPARATUS AND MOBILE PHONE

CROSS-REFERENCE TO RELATED APPLICATIONS

This application is based upon and claims the benefit of priority from the Japanese Patent Application No. 2008-193527 filed on Jul. 28, 2008; the entire contents of which are incorporated herein by reference.

BACKGROUND OF THE INVENTION

1. Field of the Invention

The present invention relates to a zoom lens applicable to small apparatuses having an imaging function, such as a digital still camera, a mobile phone provided with a camera, and a personal digital assistant (PDA).

2. Description of the Related Art

In recent years, as the size of an imaging device, such as a CCD (charge coupled device) or a CMOS (complementary metal oxide semiconductor), in an imaging apparatus, such as a digital still camera, has been reduced, there is a demand for a small imaging apparatus. Therefore, in recent years, a technique has been developed which incorporates a so-called bending-type optical system that bends the optical path of a lens system into an imaging apparatus to reduce the size of the imaging apparatus in the thickness direction.

JP-A-2000-131610 discloses a zoom lens using a bending-type optical system that includes a first lens group having a positive refractive power, a second lens group having a negative refractive power, a third lens group having a positive refractive power, and a fourth lens group having a positive refractive power arranged in this order from an object side, and moves the second negative lens group and the fourth positive lens group to vary power. In the zoom lens, a prism is provided in the first lens group to deflect the optical path at an angle of about 90°. In the first lens group, a fixed positive lens group is provided on the rear side of the prism. In addition, JP-A-2004-205796 (corresponding to U.S. Pat. No. 7,079,328) discloses a zoom lens that includes a first lens group having a negative refractive power, a second lens group having a positive refractive power, a third lens group having a negative refractive power, and a fourth lens group having a positive refractive power arranged in this order from an object side, and moves the second positive lens group and the third negative lens group to vary power. In the zoom lens, a prism is arranged closest to the object side in the first lens group and deflects an optical path at an angle of about 90°. In the first lens group, a fixed lens group is provided on the rear side of the prism.

In the bending-type zoom lenses disclosed in JP-A-2000-131610 and JP-A-2004-205796, the fixed lens group is provided on the rear side of the prism for deflecting the optical path in the first lens group, and a zoom group is provided on the rear side of the fixed lens group. In particular, as disclosed in JP-A-2000-131610, in many cases, a positive lens group fixed during zooming is provided on the rear side of the prism for deflecting the optical path in the first lens group, and a zoom group is provided on the rear side of the fixed positive lens group. Further, in many cases, the zoom group includes a negative lens group and a positive lens group arranged in this order from the object side. However, in particular, when a bending-type zoom lens is used for a mobile phone, a lens module needs to have a small thickness and a small volume. However, the bending-type zoom lens according to the related art is designed to reduce a size in the diametric direction (a direction orthogonal to the optical axis after bending), but the length of the zoom lens in the optical axis direction after bending is not considered. This is because the bending of the optical path makes it possible to sufficiently reduce the size of the bending-type zoom lens. However, it is also important to reduce the total length of the zoom lens in order to reduce the overall volume thereof. Therefore, it is necessary to develop a bending-type zoom lens having a small total length.

SUMMARY OF THE INVENTION

The invention has been made in order to solve the above-mentioned problems and an object of the invention is to provide a zoom lens having a small total length and capable of increasing an angle of view while maintaining a high optical performance, as compared to a bending-type zoom lens according to the related art in which a fixed lens group is provided between a prism for deflecting an optical path and a zoom group, and an imaging apparatus and a mobile phone capable of using the zoom lens to reduce their sizes.

According to an aspect of the invention, a zoom lens includes: a first lens group that has a negative refractive power and is fixed during zooming; a second lens group that includes a prism which has no refractive power, is fixed during zooming, and deflects an optical path; a third lens group that has a positive refractive power and is moved during zooming; a fourth lens group that has a negative refractive power and is moved during zooming; and a fifth lens group that has a positive refractive power and is fixed during zooming. The first to fifth lens groups are arranged in this order from an object side. The first lens group includes a first negative lens having a concave surface facing the object side near an optical axis and a second negative lens having a concave surface facing an image side near the optical axis arranged in this order from the object side.

In the zoom lens according to the above-mentioned aspect, the second lens group includes the prism that has no refractive power and deflects the optical path, and a zoom group including the third positive lens group and the fourth negative lens group, not a fixed positive lens group, is provided on the rear side of the prism. Therefore, it is easy to reduce the total length of the zoom lens, as compared to the structure in which a fixed lens group is provided on the rear side of the prism for deflecting the optical path and a zoom group is provided on the rear side of the fixed lens group. In particular, it is easy to reduce the total length of the zoom lens, as compared to the structure in which a fixed positive lens group is provided on the rear side of a prism and a zoom group including a negative lens group and a positive lens group is provided on the rear side of the fixed positive lens group. In addition, in the zoom lens according to the above-mentioned aspect of the invention, the first lens group including two negative lenses is provided before the prism for deflecting the optical path. Therefore, it is advantageous to increase an angle of view. It is possible to further improve an optical performance by appropriately adopting the following preferred conditions according to required specifications.

In the zoom lens according to the above-mentioned aspect, the first negative lens of the first lens group may include an object-side surface that has a concave shape near the optical axis and has an aspheric shape in the periphery thereof such that the periphery has a negative power or a positive power lower than that near the optical axis, and an image-side surface that has a convex shape near the optical axis and has an aspheric shape in the periphery thereof such that the periphery has a positive power or a negative power lower than that near the optical axis. The third lens group may include at least one positive lens having a convex surface facing the object side. The fourth lens group may include a cemented lens. The fifth lens group may include one positive aspheric lens having a convex surface facing the image side.

In this case, for example, the fourth lens group may include a cemented lens of two lenses, and one aspheric lens arranged in this order from the object side.

For example, the third lens group may include a positive aspheric lens having aspheric surfaces at both sides and a positive spherical lens having spherical surfaces at both sides arranged in this order from the object side.

It is preferable that the zoom lens according to the above-mentioned aspect selectively satisfy Condition expressions 1 to 4 given below:

$$0 < f12/f11 < 1.0 \quad \text{[Conditional expression 1]}$$

(where f11 indicates the focal length of the first negative lens in the first lens group, and f12 indicates the focal length of the second negative lens in the first lens group), $$-1.5 < f3/f4 < -0.5 \quad \text{[Conditional expression 2]}$$

(where f3 indicates the focal length of the third lens group, and f4 indicates the focal length of the fourth lens group), $$0.7 < Himg/fw \quad \text{[Conditional expression 3]}$$

(where fw indicates the focal length of the entire system at a wide angle end, and Himg indicates the largest image height), and $$50 < vG3 \quad \text{[Conditional expression 4]}$$

(where vG3 indicates the average value of the Abbe numbers of the lenses in the third lens group with respect to the d-line (wavelength: 587.6 nm).

According to another aspect of the invention, an imaging apparatus or a mobile phone includes: the zoom lens according to the above-mentioned aspect; and an imaging device that outputs an image signal corresponding to an optical image formed by the zoom lens. According to this structure, since the imaging apparatus or the mobile phone uses a high-performance zoom lens having a small size and a low manufacturing cost according to the above-mentioned aspect as an imaging lens, it is possible to reduce the overall size and cost of an apparatus.

The mobile phone according to the above-mentioned aspect may further include a case having a rectangular surface (for example, an operation surface or an image display surface). In this case, for example, the zoom lens may be arranged in the case such that an optical axis after an optical path is deflected is aligned with the lateral direction of the case.

According to the zoom lens of the above-mentioned aspect, it is possible to reduce a total length after the optical path is deflected. Therefore, the zoom lens can be arranged in a small apparatus, such as a mobile phone, so as to be aligned with the lateral direction thereof. As a result, the zoom lens can contribute to reducing the size of an apparatus.

In the zoom lens according to the above-mentioned aspect, the second lens group includes the prism that has no refractive power and deflects the optical path, and a zoom group including the third positive lens group and the fourth negative lens group, not a fixed lens group, is provided on the rear side of the prism. Therefore, it is easy to reduce the total length of the zoom lens while maintaining a high optical performance, as compared to the bending-type zoom lens according to the related art in which a fixed lens group is provided between a prism for deflecting the optical path and a zoom group. In addition, the first lens group including two negative lenses having an optimal structure is provided before the prism for deflecting the optical path. Therefore, it is advantageous to increase an angle of view, as compared to the structure in which only one negative lens is provided.

The imaging apparatus or the mobile phone according to the above-mentioned aspect of the invention uses the high-performance zoom lens having a small size and a low manufacturing cost according to the above-mentioned aspect as an imaging lens. Therefore, it is possible to reduce the overall size and cost of an apparatus while maintaining a high imaging performance.

BRIEF DESCRIPTION OF THE DRAWINGS

FIG. 8A is a diagram illustrating basic lens data of the zoom lens according to Example 1;

FIG. 8B is a diagram illustrating surface spacing data of portions of the zoom lens according to Example 1 that are moved when power varies;

FIG. 9A is a diagram illustrating basic lens data of the zoom lens according to Example 2;

FIG. 9B is a diagram illustrating surface spacing data of portions of the zoom lens according to Example 2 that are moved when power varies;

FIG. 10A is a diagram illustrating basic lens data of the zoom lens according to Example 3;

FIG. 10B is a diagram illustrating surface spacing data of portions of the zoom lens according to Example 3 that are moved when power varies;

FIG. 11A is a diagram illustrating basic lens data of the zoom lens according to Example 4;

FIG. 11B is a diagram illustrating surface spacing data of portions of the zoom lens according to Example 4 that are moved when power varies;

FIG. 12A is a diagram illustrating basic lens data of the zoom lens according to Example 5;

FIG. 12B is a diagram illustrating surface spacing data of portions of the zoom lens according to Example 5 that are moved when power varies;

FIG. 13A is a diagram illustrating basic lens data of the zoom lens according to Example 6;

FIG. 13B is a diagram illustrating surface spacing data of portions of the zoom lens according to Example 6 that are moved when power varies;

FIG. 14 is a diagram illustrating lens data related to aspheric surfaces of the zoom lens according to Example 1;

FIG. 15 is a diagram illustrating lens data related to aspheric surfaces of the zoom lens according to Example 2;

FIG. 16 is a diagram illustrating lens data related to aspheric surfaces of the zoom lens according to Example 3;

FIG. 17 is a diagram illustrating lens data related to aspheric surfaces of the zoom lens according to Example 4;

FIG. 18 is a diagram illustrating lens data related to aspheric surfaces of the zoom lens according to Example 5;

FIG. 19 is a diagram illustrating lens data related to aspheric surfaces of the zoom lens according to Example 6;

FIG. 20 is a diagram illustrating values related to conditional expressions in Examples 1 to 6;

DESCRIPTION OF THE PREFERRED EMBODIMENTS

Hereinafter, exemplary embodiments of the invention will be described in detail with reference to the accompanying drawings.

Figure 1:
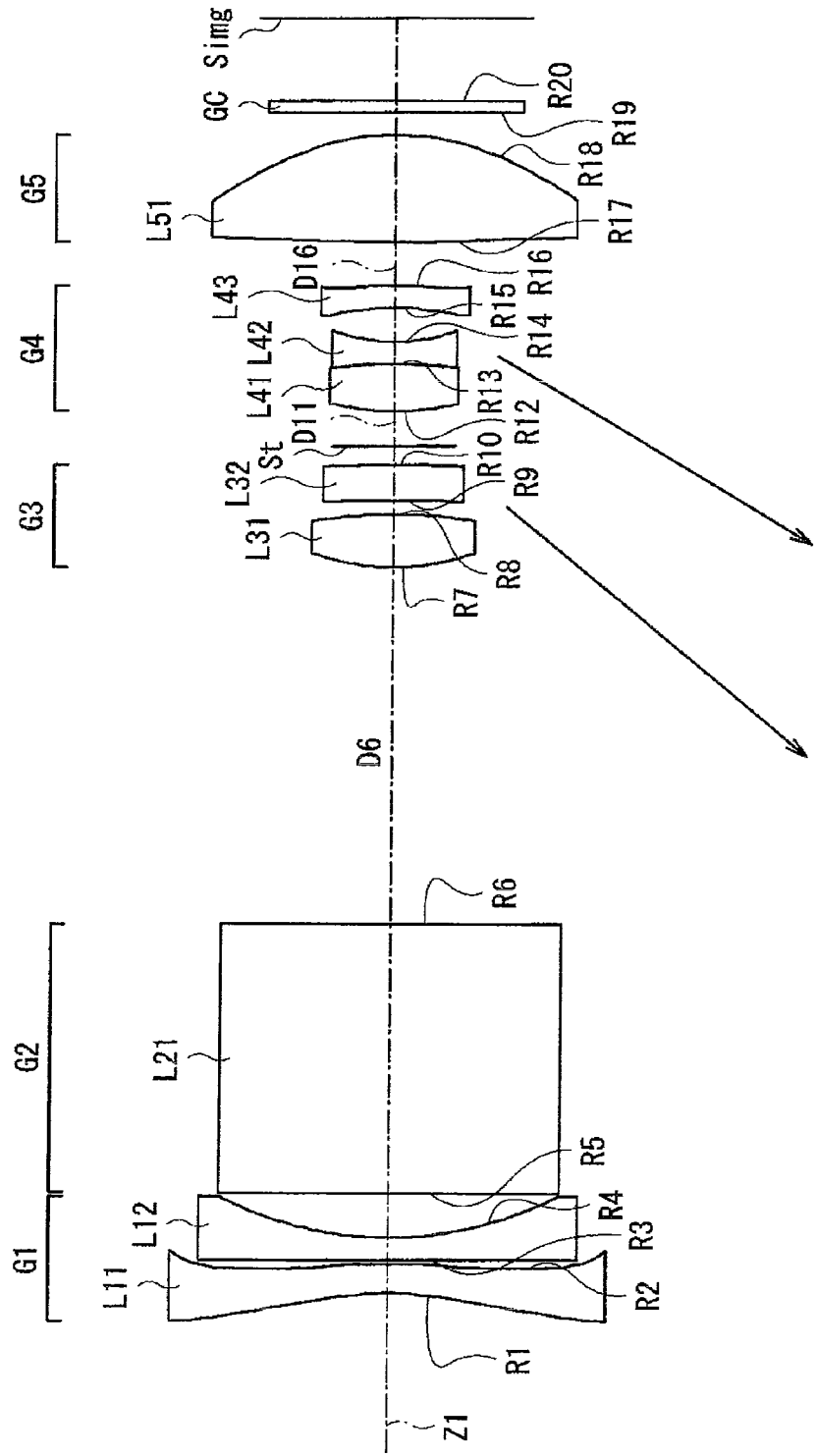
FIG. 1 is a diagram illustrating a first structural example of a zoom lens according to an embodiment of the invention, and is a lens cross-sectional view corresponding to Example 1.

FIG. 1 is a diagram illustrating a first structural example of a zoom lens according to an embodiment of the invention. The structural example corresponds to the structure of a lens according to a first numerical example (FIGS. 8A and 8B and FIG. 14), which will be described below. FIGS. 2 to 6 show second to sixth structural examples, and correspond to the structures of lenses according to second to sixth numerical examples, which will be described below. In FIGS. 1 to 6, Ri indicates the curvature radius of an i-th surface. In this case, the surface of a component closest to an object side is given number 1, and the surface number is sequentially increased toward an image side (imaging side). In addition, Di indicates the surface spacing between the i-th surface and an (i+1)-th surface on an optical axis Z1. Di is given to only the surface spacing between components that varies when power varies. FIGS. 1 to 6 show the arrangement of the lenses at a wide angle end.

The zoom lens includes a first lens group G1 having a negative refractive power, a second lens group G2, a third lens group G3 having a positive refractive power, a fourth lens group G4 having a negative refractive power, and a fifth lens group G5 having a positive refractive power arranged in this order from the object side along the optical axis Z1. The second lens group G2 includes a prism L21 for deflecting an optical path, but does not have any refractive power. For example, an aperture diaphragm St is provided between the third lens group G3 and the fourth lens group G4.

The zoom lens can be mounted to small imaging apparatuses having an imaging function, such as a digital camera, a video camera, a mobile phone provided with a camera, and a PDA. A member corresponding to the structure of an imaging unit of the mounted camera is provided on the image side of the zoom lens. For example, an imaging device (not shown), such as a CCD (charge coupled device) or a CMOS (complementary metal oxide semiconductor), is provided on an image forming surface (imaging surface) Simg of the zoom lens. Various optical members GC corresponding to the structure of a camera provided with lenses may be provided between the fifth lens group G5 and the imaging surface. The optical members GC include, for example, plate-shaped members, such as a cover glass for protecting the imaging surface and various optical filters. In this case, for example, a member obtained by coating a film having a filter effect, such as an infrared cut filter or an ND filter, onto the plate-shaped cover glass may be used as the optical member GC. In addition, in the zoom lens, a film having a filter effect, such as an infrared cut filter or an ND filter, or an antireflection film may be coated onto the surfaces of all of the lenses or at least one lens surface in the first to fifth lens groups G1 to G5.

In the zoom lens, the first lens group G1, the second lens group G2, and the fifth lens group G5 are fixed all the time during zooming, and the third lens group G3 and the fourth lens group G4 are individually moved along the optical axis Z1 during zooming. The third lens group G3 and the fourth lens group G4 are moved to the object side in one direction, without being reversely moved to the image side along the optical axis Z1, so as to draw the loci represented by solid arrows in FIGS. 1 to 6 when power varies from the wide angle end to the telephoto end.

The zoom lens according to this embodiment is a bending-type optical system. As shown in FIG. 7, actually, the optical path is deflected at an angle of about 90° by an inner reflecting surface 10 of the prism L21. In FIGS. 1 to 6, the inner reflecting surface 10 of the prism L21 is omitted, and the optical components are expanded in one direction on the optical axis Z1.

The first lens group G1 includes a first negative lens L11 having a concave surface facing the object side near the optical axis and a second negative lens L12 having a concave surface facing the image side near the optical axis arranged in this order from the object side. It is preferable that the two negative lenses L11 and L12 of the first lens group G1 satisfy Conditional expression 1 given below:

$$0 < f12/f11 < 1.0 \quad \text{[Conditional expression 1]}$$

(where f11 indicates the focal length of the first negative lens L11 and f12 indicates the focal length of the second negative lens L12).

In the first lens group G1, it is preferable that the first negative lens L11 be an aspheric lens having aspheric surfaces at both sides. It is preferable that both an object-side surface and an image-side surface of the first negative lens L11 have an aspheric shape in the peripheries thereof in which a tangent plane to the lens surface is inclined so as to face from the object side to the image side as the distance from the center to the periphery of the lens is increased. For example, it is preferable that the object-side surface of the first negative lens L11 have a concave shape near the optical axis, the negative power thereof be decreased toward the periphery, and the object-side surface have a substantially convex shape in the periphery. That is, the object-side surface of the first negative lens L11 may have a concave shape near the optical axis and have a negative power in the periphery that is lower than that near the optical axis. In particular, it is more preferable that the outermost portion of the object-side surface of the first negative lens L11 through which a ray passes have a positive power. For example, it is preferable that the image-side surface of the first negative lens L11 have a convex shape near the optical axis, the positive power thereof be decreased toward the periphery, and the image-side surface have a substantially concave shape in the periphery. That is, the image-side surface of the first negative lens L11 may have a convex shape near the optical axis and have a positive power in the periphery that is lower than that near the optical axis. In particular, it is more preferable that the outermost portion of the image-side surface of the first negative lens L11 through which a ray passes have a negative power.

The third lens group G3 includes at least one positive lens having a convex surface facing the object side. In the sixth structural example shown in FIG. 6, the third lens group G3 includes only one first positive lens L31 having a convex surface facing the object side. In the first to fifth structural examples shown in FIGS. 1 to 5, the third lens group G3 includes a first positive lens L31 and a second positive lens L32 arranged in this order from the object side. It is preferable that the first positive lens L31 be a positive aspheric lens having aspheric surfaces at both sides. It is preferable that the second positive lens L32 be a positive spherical lens having spherical surfaces at both sides.

It is preferable that the fourth lens group G4 include a cemented lens. In the structural examples shown in FIGS. 1 to 6, the fourth lens group G4 includes a cemented lens of two lenses L41 and L42, and an aspheric lens L43 having a concave surface facing the object side near the optical axis arranged in this order from the object side.

The fifth lens group G5 includes a positive lens L51 having a convex surface facing the image side. It is preferable that the positive lens L51 be an aspheric lens having aspheric surfaces at both sides.

It is preferable that the zoom lens selectively satisfy Conditional expressions 2 to 4 given below:

$$-1.5 < f3/f4 < -0.5, \quad \text{[Conditional expression 2]}$$

$$0.7 < Himg/fw, \text{ and} \quad \text{[Conditional expression 3]}$$

$$50 < vG3 \quad \text{[Conditional expression 4]}$$

(where f3 indicates the focal length of the third lens group G3, f4 indicates the focal length of the fourth lens group G4, fw indicates the focal length of the entire system at the wide angle end, Himg indicates the largest image height, and vG3 indicates the average value of the Abbe numbers of the lenses in the third lens group G3 with respect to the d-line).

Figure 33:
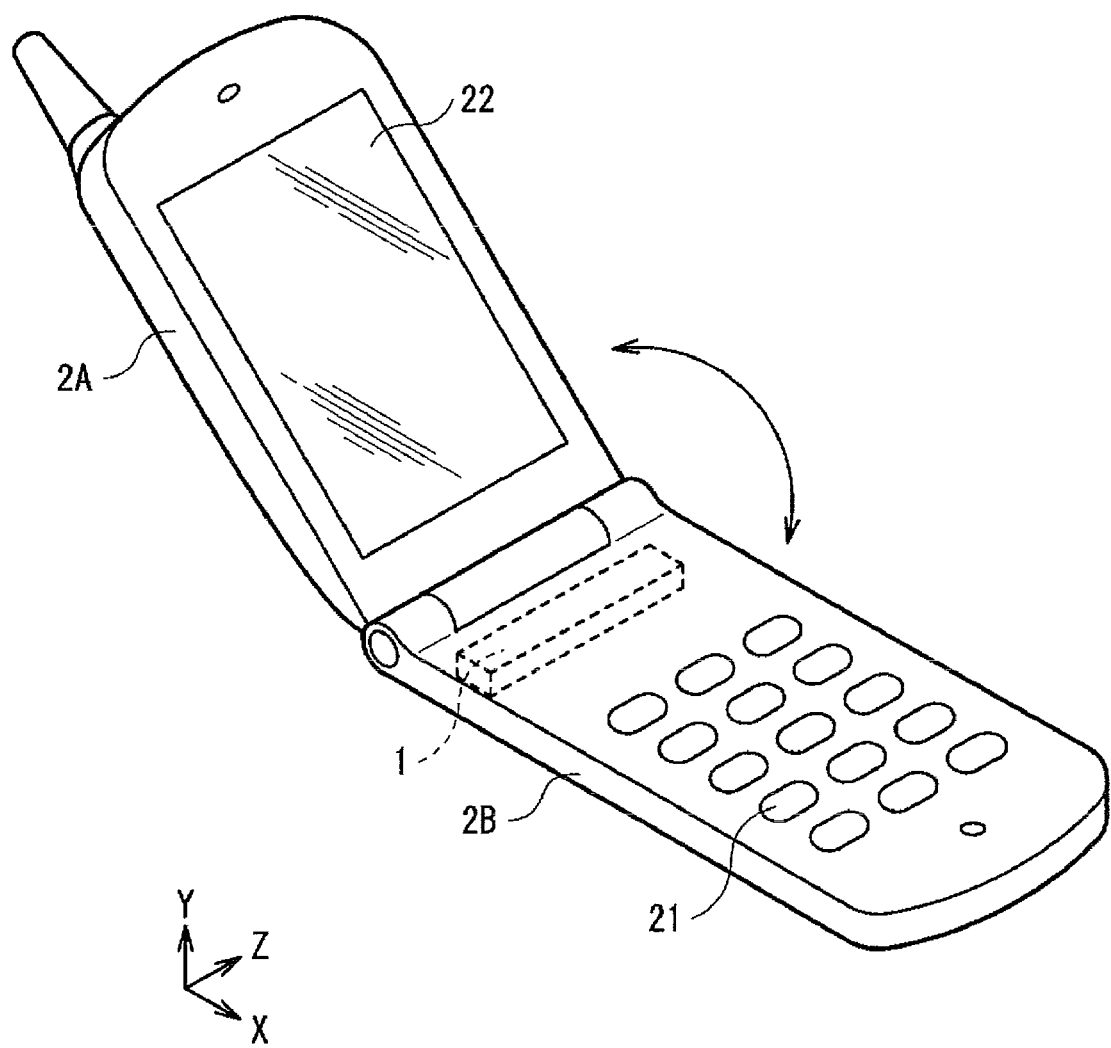
FIG. 33 is an appearance diagram illustrating an example of the structure of a mobile phone serving as an imaging apparatus according to another embodiment of the invention.

FIG. 33 is a diagram illustrating a mobile phone provided with a camera as an example of the imaging apparatus according to this embodiment. The mobile phone provided with a camera shown in FIG. 33 includes an upper case 2A and a lower case 2B, and the two cases are configured so as to be rotatable in the direction of an arrow in FIG. 33. The lower case 2B has a rectangular operation surface having operating keys 21 provided thereon. The upper case 2A has a rectangular display surface having a display unit 22 composed of a display panel, such as an LCD (liquid crystal panel) or an EL (Electro-Luminescence) panel, provided therein. The display unit 22 is provided in a surface of the mobile phone that is disposed inside when it is folded. The display unit 22 can display an image captured by the camera unit 1 as well as various menus related to a call function. The camera unit 1 is provided with a camera module formed by integrating an imaging lens, which is the zoom lens according to this embodiment, with an imaging device, such as a CCD. In the mobile phone provided with a camera, the imaging device converts an optical image formed by the imaging lens of the camera unit 1 into an electric image signal, and the image signal is output to a signal processing circuit of a mobile phone body. The camera module of the camera unit 1 uses the zoom lens according to this embodiment as the imaging lens to obtain a high-resolution image signal. The mobile phone body can generate a high-resolution image on the basis of the image signal.

For example, the camera unit 1 is provided in the lower case 2B such that the optical axis of the zoom lens according to this embodiment after the optical path is deflected is aligned with the lateral direction (the Z direction in FIG. 33) of the operation surface of the lower case 2B. In this case, for example, a lens system may be provided in which an imaging aperture through which light from a subject is incident is disposed in a surface opposite to the operation surface. It is possible to reduce the total length of the zoom lens according to this embodiment after the optical path is deflected. Therefore, the zoom lens can be arranged in the lateral direction of the case of a small mobile phone. In this way, it is possible to align the longitudinal and lateral directions of the display unit 22 of the mobile phone body with the longitudinal and lateral directions of the camera unit 1. As a result, it is possible to capture an image with an aspect ratio suitable for the size of the display unit 22.

The camera unit 1 may be provided in the upper case 2A, instead of the lower case 2B. In addition, the arrangement of the camera unit 1 is not limited to the above, but the optical axis of the lens system after the optical path is deflected may be aligned with the longitudinal direction (for example, the X direction in FIG. 33) of the case. In addition, the arrangement of the camera unit is not limited to the structure in which the optical axis after the optical path is deflected is completely aligned with the lateral direction or the longitudinal direction of the case, but the optical axis may be inclined with respect to the lateral direction or the longitudinal direction.

In addition, the zoom lens according to this embodiment can be appropriately used as image lenses of various information terminal apparatuses (for example, a PDA) having an imaging function, digital still cameras, and video cameras.

Next, the operations and effects of the zoom lens having the above-mentioned structure will be described. In the zoom lens, the second lens group G2 includes the prism L21 that has no refractive power and is for deflecting the optical path, and a zoom group including the third positive lens group G3 and the fourth negative lens group G4, not a fixed lens group, is provided on the rear side of the prism L21. According to this structure, it is easy to reduce the total length of the zoom lens, as compared to the related art in which a fixed positive lens group is provided on the rear side of the prism L21 and a zoom group including a negative lens group and a positive lens group is provided on the rear side of the fixed positive lens group.

The first lens group G1 including two negative lenses L11 and L12 is provided before the prism L21 for deflecting the optical path. Therefore, it is easy to increase an angle of view, as compared to, for example, the structure in which only one negative lens is provided before the prism. In particular, the structure is optimized such that the two negative lenses L11 and L12 satisfy Conditional expression 1. In this case, it is possible to increase an angle of view and reduce the thickness of a lens system. Conditional expression 1 defines an appropriate ratio between the focal lengths of the two negative lenses L11 and L12 in the first lens group G1. In the zoom lens, when the power of the first negative lens L11 arranged on the object side in the first lens group G1 is very strong, the thickness of the lens system when the optical path is deflected increases, which is not preferable. When the lenses do not satisfy Conditional expression 1, the thickness of the lens system increases. The two lenses preferably satisfy the following Conditional expression 1A, and more preferably, the following Conditional expression 1B in order to obtain a higher performance:

$0.1 < f12/f11 < 0.9$, and  [Conditional expression 1A]

$0.2 < f12/f11 < 0.8$.  [Conditional expression 1B]

Conditional expression 2 defines an appropriate relationship between the refractive power of the third lens group G3 and the refractive power of the fourth lens group G4. When the ratio between the refractive powers is greater than the upper limit of Conditional expression 2, the total length of the lens system increases. When the ratio is less than the lower limit thereof, the total length is reduced, but the performance of the lens system deteriorates. As a result, particularly, it is difficult to remove longitudinal chromatic aberration, which is not preferable. The ratio preferably satisfies the following Conditional expression 2A, and more preferably, the following Conditional expression 2B in order to obtain a higher performance:

$-1.3 < f3/f4 < -0.8$, and  [Conditional expression 2A]

$-1.2 < f3/f4 < -0.9$.  [Conditional expression 2B]

Conditional expression 3 is conditions for increasing an angle of view. When the conditions of Conditional expression 3 are not satisfied, an angle of view is narrowed. As a result, the market value of a lens system is lowered.

Conditional expression 4 relates to a lens material in the third lens group G3, and contributes to correcting chromatic aberration. When the average value is less than the lower limit of Conditional expression 4, an excessively large chromatic aberration occurs, and it is difficult to achieve a high-performance zoom lens, which is not preferable. It is preferable that the zoom lens satisfy the following Conditional expression 4A in order to more effectively correct the chromatic aberration:

$55 < vG3$.  [Conditional expression 4A]

As described above, according to the zoom lens of this embodiment, it is possible to maintain a high optical performance and reduce the total length of the zoom lens, as compared to a bending-type zoom lens according to the related art in which a fixed lens group is provided between a prism for deflecting the optical path and a zoom group. In addition, since the first lens group G1 includes two negative lenses L11 and L12, it is possible to increase an angle of view, as compared to, for example, the structure in which only one negative lens is provided. Further, the imaging apparatus or the mobile phone of this embodiment uses the high-performance zoom lens according to this embodiment as an imaging lens and outputs an image signal corresponding to the optical image formed by the zoom lens. Therefore, it is possible to obtain a bright and high-resolution image. When the zoom lens according to this embodiment is used as the imaging lens, it is possible to obtain a performance corresponding to a large number of pixels, for example, about 8 mega pixels.

EXAMPLES

Next, detailed numerical examples of the zoom lens according to this embodiment will be described. A plurality of numerical examples will be described below.

FIGS. 8A and 8B and FIG. 14 show detailed lens data corresponding to the structure of the zoom lens shown in FIG. 1. In the lens data shown in FIG. 8A, an i-th surface number is written in the field of a surface number Si. In this case, the surface of a component closest to the object side in the zoom lens according to Example 1 is given number 1, and the surface number is sequentially increased toward the image side. The curvature radius (mm) of the i-th surface from the object side is written in the field of a curvature radius Ri so as to correspond to Ri shown in FIG. 1. The spacing (mm) between the i-th surface Si and an (i+1)-th surface Si+1 on the optical axis is written in the field of a surface spacing Di. The refractive index between the i-th surface Si and the (i+1)-th surface Si+1 from the object side with respect to the d-line (wavelength: 587.6 nm) is written in the field of Ndi. The Abbe number of a j-th optical component from the object side with respect to the d-line is written in the field of vdj.

In the zoom lens according to Example 1, when power varies, the third lens group G3 and the fourth lens group G4 are moved along the optical axis, and the surface spacing D6 between the second lens group and the third lens group, the surface spacing D11 between the third lens group and the fourth lens groups, and the surface spacing D16 between the fourth lens group and the fifth lens group vary. FIG. 8B shows the values of the surface spacings D6, D11, and D16 at the wide angle end and the telephoto end as data when power varies.

In the lens data shown in FIG. 8A, symbol '*' added to the left side of the surface number indicates an aspheric lens surface. In the zoom lens according to Example 1, both surfaces S1 and S2 of the first negative lens L11 in the first lens group G1, both surfaces S7 and S8 of the first positive lens L31 in the third lens group G3, both surfaces S15 and S16 of the lens L43 in the fourth lens group G4, and both surfaces S17 and S18 of the positive lens L51 in the fifth lens group G5 are all aspheric surfaces. The curvature radius of the aspheric surface near the optical axis is written in the field of the curvature radius Ri shown in FIG. 8A.

FIG. 14 shows aspheric data of the zoom lens according to Example 1. In the numerical values represented as the aspheric data in FIG. 14, 'E' indicates the exponent of 10, and the number represented by an exponential function having 10 as a base is multiplied by a number before 'E'. For example, '1.0E-02' indicates '$1.0 \times 10^{-2}$'.

The aspheric data of the zoom lens according to Example 1 includes coefficients $A_n$ and K of Aspheric expression A given below:

$$Z = C \cdot h^2 / \{1 + (1-(K+1) \cdot C^2 \cdot h^2)^{1/2}\} + \Sigma A_n \cdot h^n \quad \text{[Aspheric expression A]}$$

(where n is an integer equal to or greater than 3, Z indicates the depth (mm) of an aspheric surface, h indicates the distance (height) (mm) from the optical axis to a lens surface, K indicates a conic constant, C indicates a paraxial curvature=1/R (R is a paraxial curvature radius), and $A_n$ indicates an n-order aspheric coefficient).

Specifically, Z indicates the length (mm) of a perpendicular line that drops from a point on the aspheric surface at a height h from the optical axis to a plane tangent to the top of the aspheric surface (a plane vertical to the optical axis).

In the zoom lens according to Example 1, each of the aspheric surfaces is represented by effectively using even-numbered coefficients $A_4$, $A_6$, $A_8$, and $A_{10}$ as the aspheric coefficient $A_n$.

Figure 2:
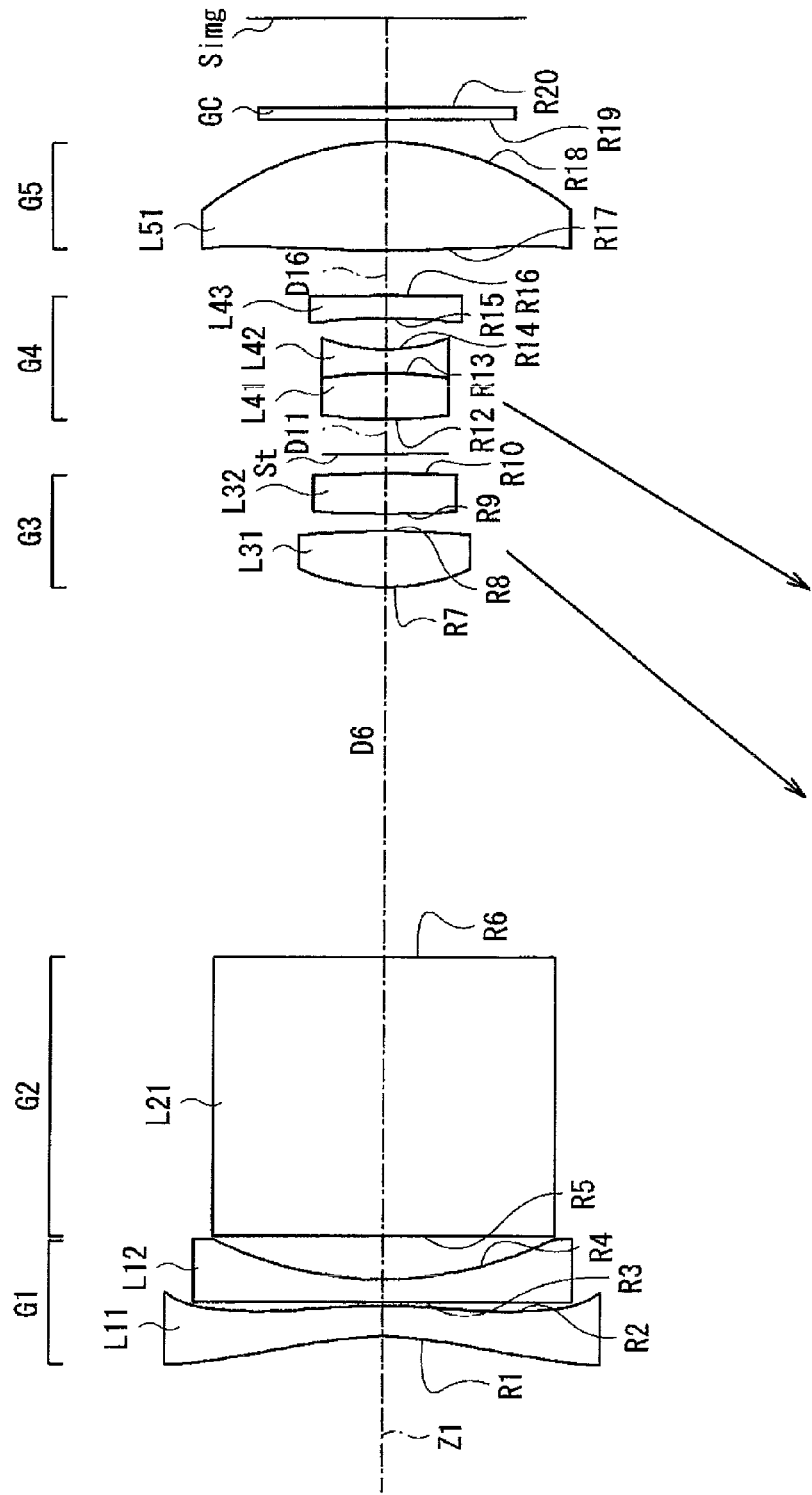
FIG. 2 is a diagram illustrating a second structural example of the zoom lens according to the embodiment of the invention, and is a lens cross-sectional view corresponding to Example 2.
Figure 3:
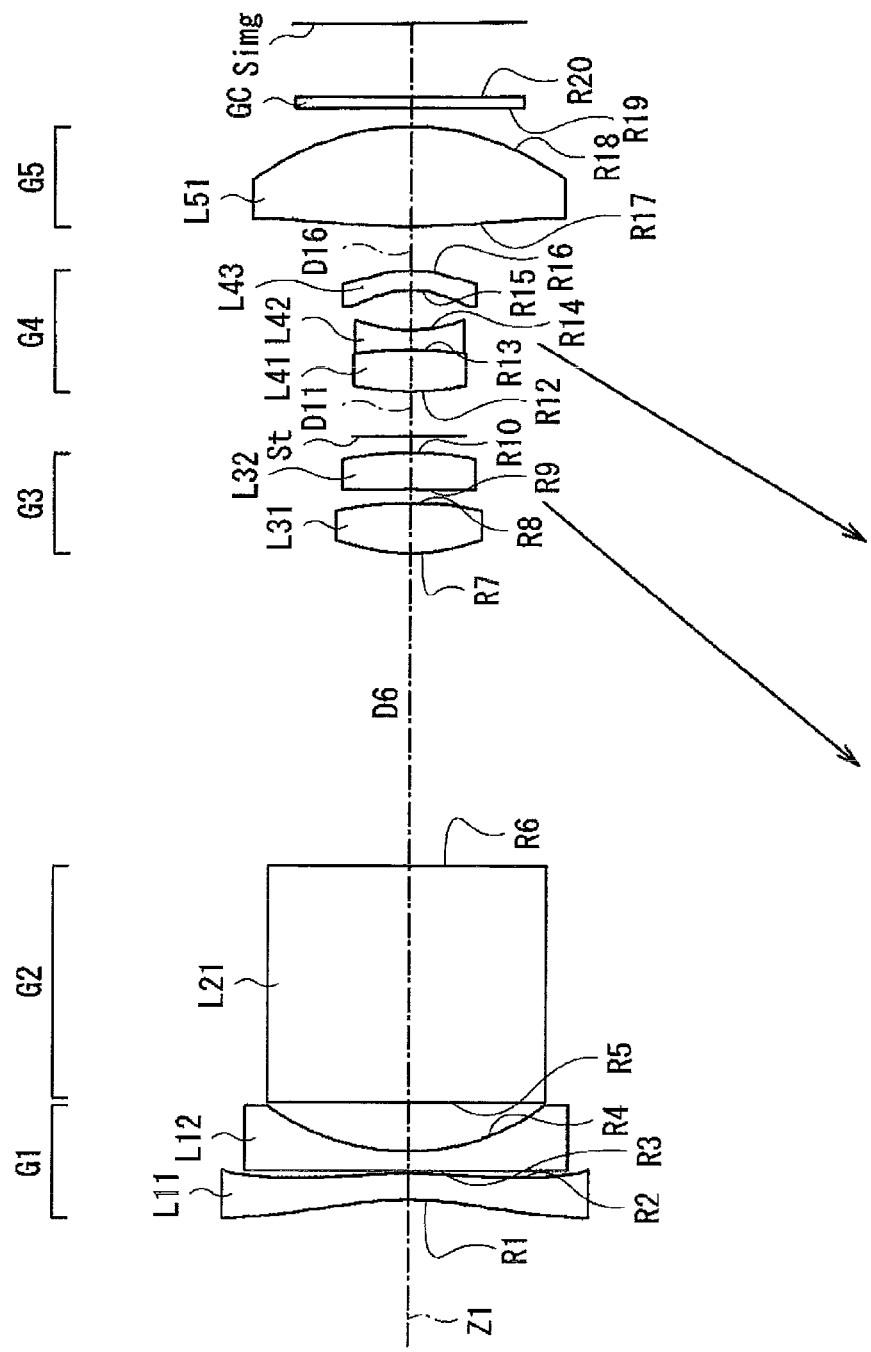
FIG. 3 is a diagram illustrating a third structural example of the zoom lens according to the embodiment of the invention, and is a lens cross-sectional view corresponding to Example 3.
Figure 4:
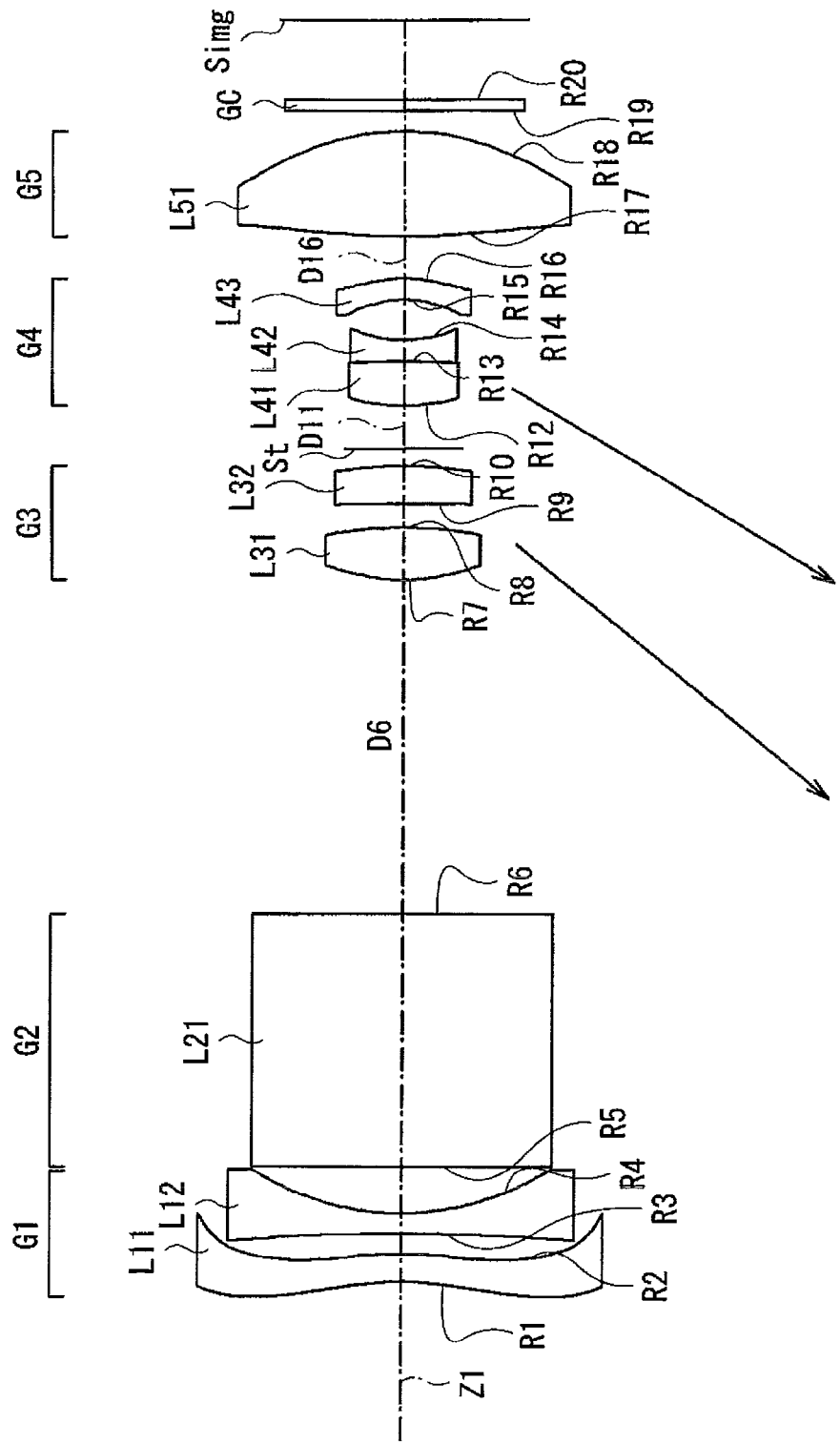
FIG. 4 is a diagram illustrating a fourth structural example of the zoom lens according to the embodiment of the invention, and is a lens cross-sectional view corresponding to Example 4.
Figure 5:
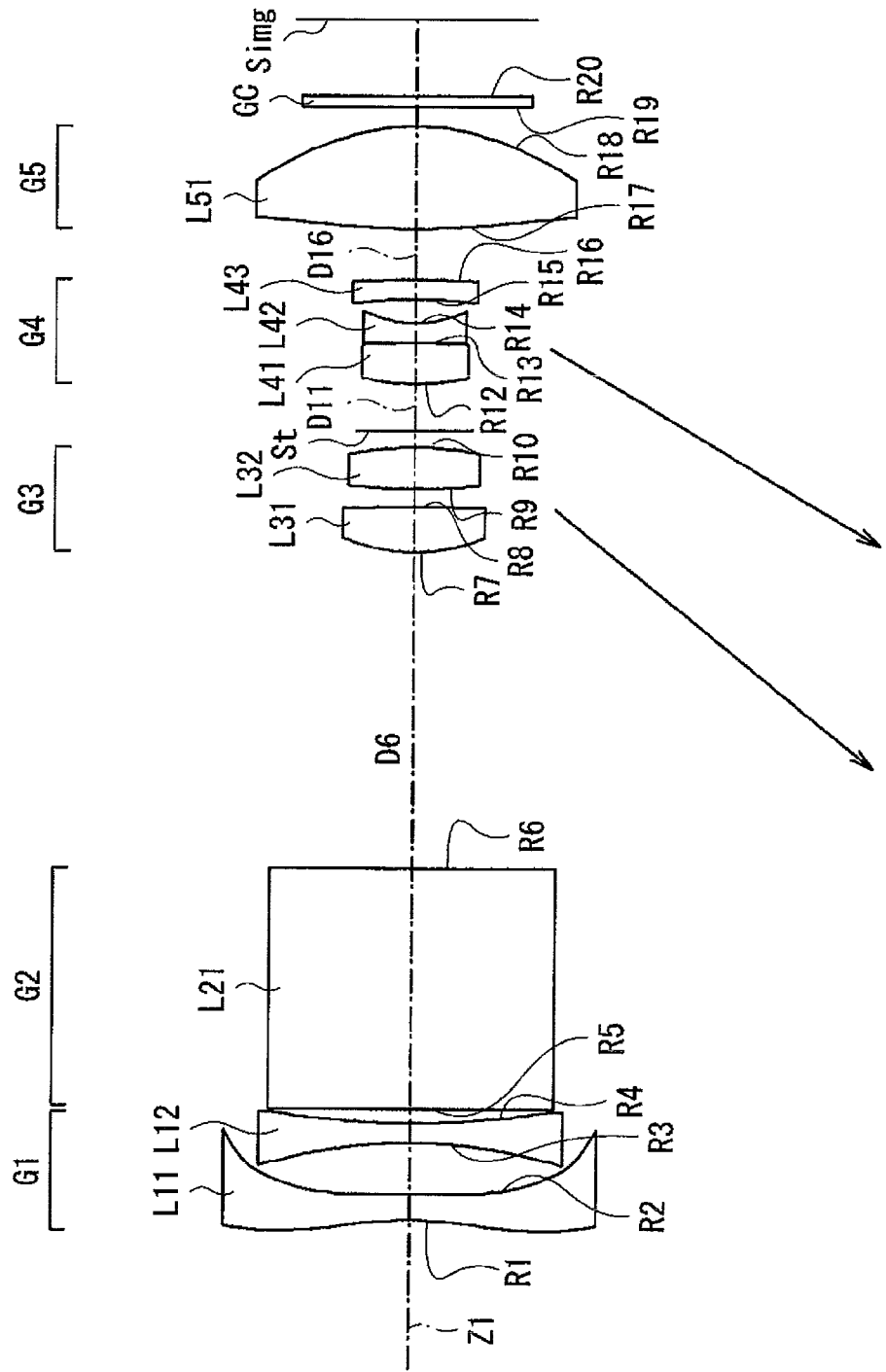
FIG. 5 is a diagram illustrating a fifth structural example of the zoom lens according to the embodiment of the invention, and is a lens cross-sectional view corresponding to Example 5.

FIGS. 9A and 9B and FIG. 15 show detailed lens data corresponding to the structure of a zoom lens according to Example 2 shown in FIG. 2, similar to the zoom lens according to Example 1. Similarly, FIGS. 10A to 12B and FIGS. 16 to 18 show detailed lens data corresponding to the structures of zoom lenses according to Examples 3 to 5 shown in FIGS. 3 to 5. The basic structure of each of the zoom lenses according to Examples 2 to 5 is similar to that of the zoom lens according to Example 1. Similar to the zoom lens according to Example 1, in the zoom lenses according to Examples 2 to 5, when power varies, the third lens group G3 and the fourth lens group G4 are moved along the optical axis, and the surface spacing D6 between the second lens group and the third lens group, the surface spacing D11 between the third lens group and the fourth lens groups, and the surface spacing D16 between the fourth lens group and the fifth lens group vary. In addition, similar to the zoom lens according to Example 1, in the zoom lenses according to Examples 2 to 5, both surfaces S1 and S2 of the first negative lens L11 in the first lens group G1, both surfaces S7 and S8 of the first positive lens L31 in the third lens group G3, both surfaces S15 and S16 of the lens L43 in the fourth lens group G4, and both surfaces S17 and S18 of the positive lens L51 in the fifth lens group G5 are all aspheric surfaces. In the zoom lenses according to Examples 2 to 5, each of the aspheric surfaces is represented by effectively using the even-numbered coefficients $A_4$, $A_6$, $A_8$, and $A_{10}$ as the aspheric coefficient $A_n$.

Figure 6:
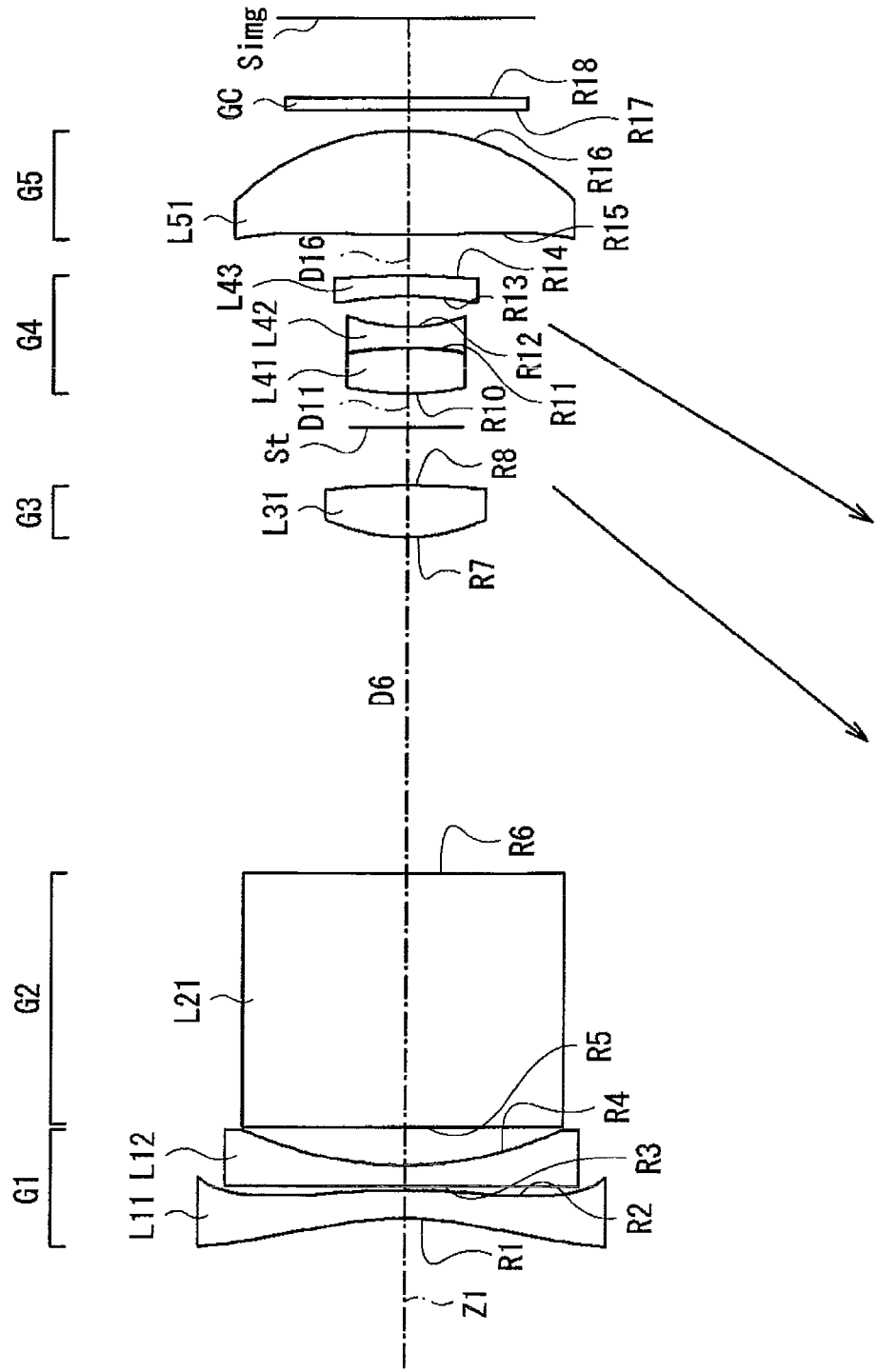
FIG. 6 is a diagram illustrating a sixth structural example of the zoom lens according to the embodiment of the invention, and is a lens cross-sectional view corresponding to Example 6.
Figure 7:
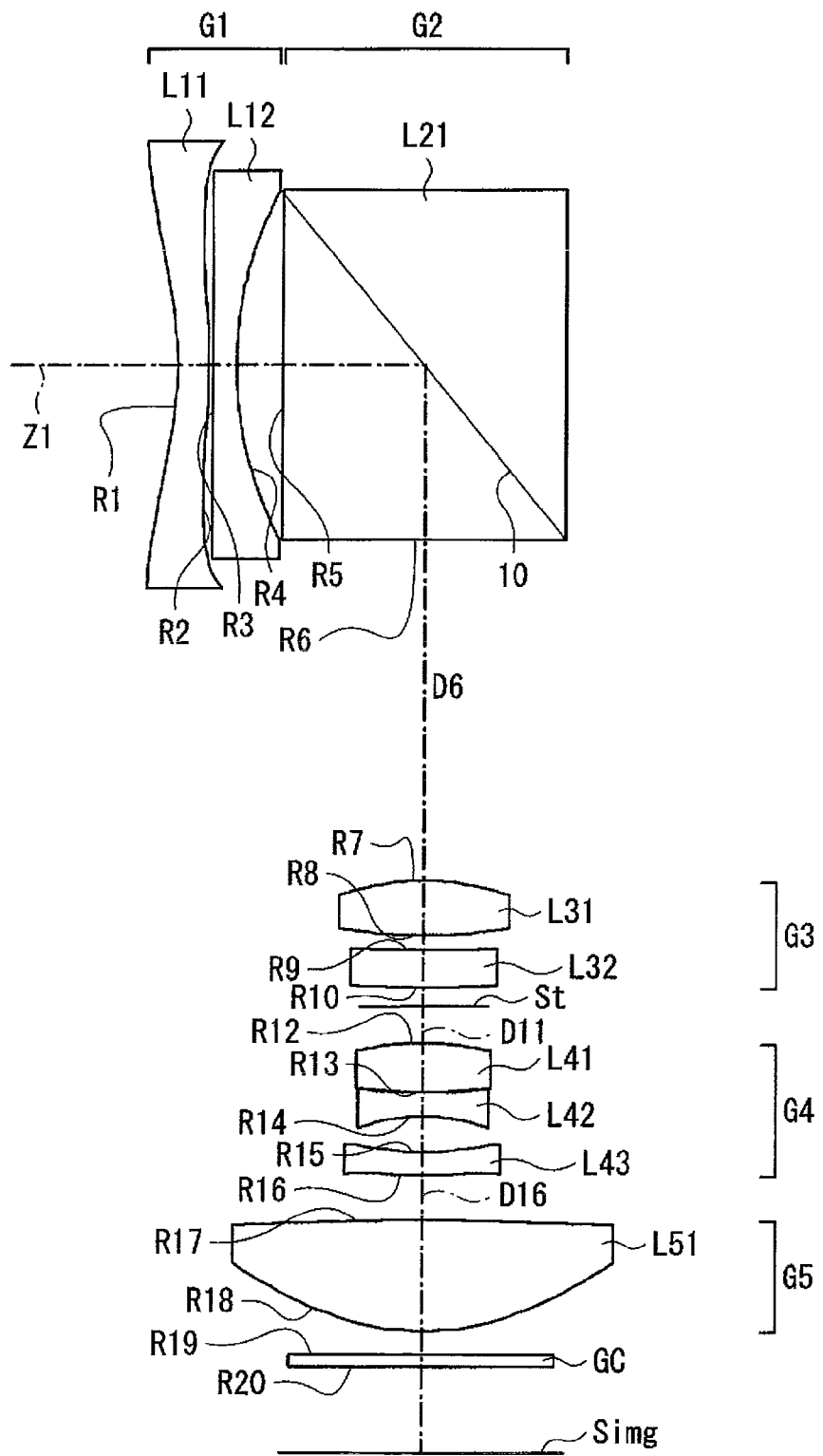
FIG. 7 is a lens cross-sectional view illustrating the structure of a bending-type optical system.

Similarly, FIGS. 13A and 13B and FIG. 19 show detailed lens data corresponding to the structure of a zoom lens according to Example 6 shown in FIG. 6. In the zoom lens according to Example 6, the third lens group G3 includes only one first positive lens L31 as a lens component. Similar to the zoom lens according to Example 1, in the zoom lens according to Example 6, when power varies, the third lens group G3 and the fourth lens group G4 are moved along the optical axis, and the surface spacing D6 between the second lens group and the third lens group, the surface spacing D9 between the third lens group and the fourth lens groups, and the surface spacing D14 between the fourth lens group and the fifth lens group vary. In addition, similar to the zoom lens according to Example 1, in the zoom lens according to Example 6, both surfaces S1 and S2 of the first negative lens L11 in the first lens group G1, both surfaces S7 and S8 of the first positive lens L31 in the third lens group G3, both surfaces S13 and S14 of the lens L43 in the fourth lens group G4, and both surfaces S15 and S16 of the positive lens L51 in the fifth lens group G5 are all aspheric surfaces. In the zoom lens according to Example 6, each of the aspheric surfaces is represented by effectively using the even-numbered coefficients $A_4$, $A_6$, $A_8$, and $A_{10}$ as the aspheric coefficient $A_n$.

FIG. 20 shows values related to the above-mentioned Conditional expressions according to Examples 1 to 6. As can be seen from FIG. 20, the values of Examples 1 to 6 are within the numerical ranges of Conditional expressions 1 to 4.

Figure 21A:
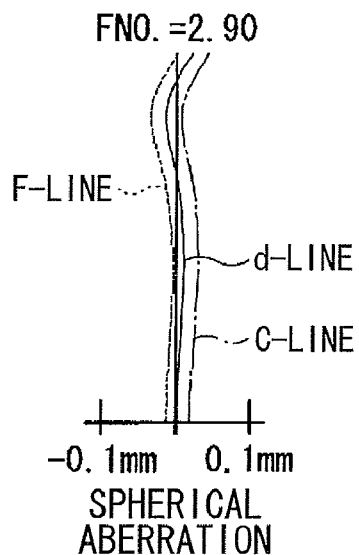
FIG. 21A is a diagram illustrating the spherical aberration of the zoom lens according to Example 1 at a wide angle end.
Figure 21B:
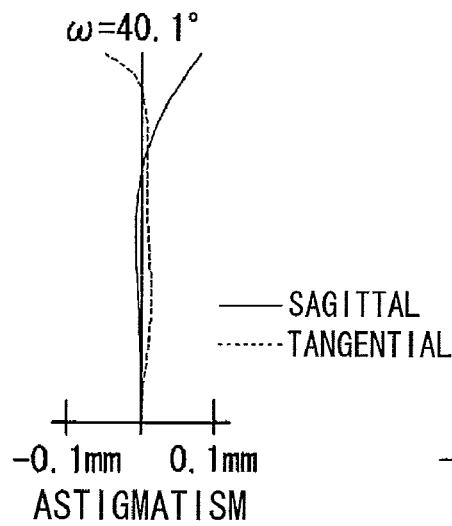
FIG. 21B is a diagram illustrating the astigmatism of the zoom lens according to Example 1 at the wide angle end.
Figure 21C:
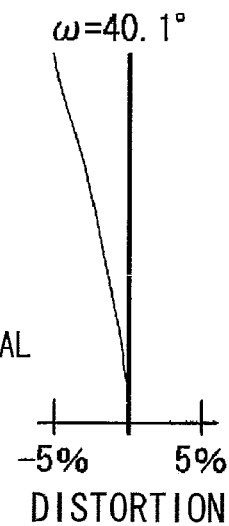
FIG. 21C is a diagram illustrating the distortion of the zoom lens according to Example 1 at the wide angle end.
Figure 22A:
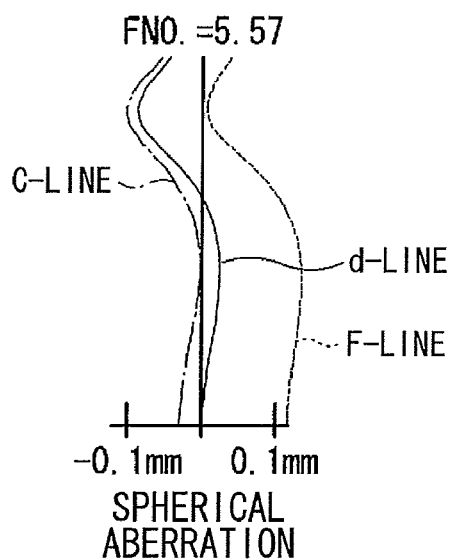
FIG. 22A is a diagram illustrating the spherical aberration of the zoom lens according to Example 1 at a telephoto end.
Figure 22B:
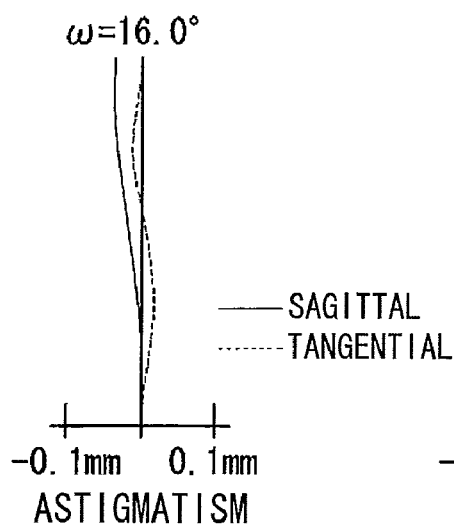
FIG. 22B is a diagram illustrating the astigmatism of the zoom lens according to Example 1 at the telephoto end.
Figure 22C:
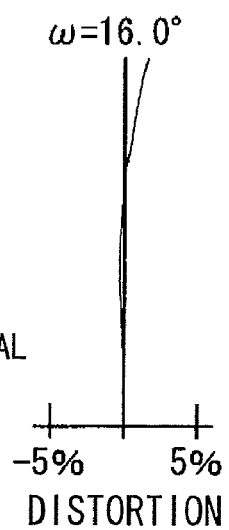
FIG. 22C is a diagram illustrating the distortion of the zoom lens according to Example 1 at the telephoto end.

FIGS. 21A to 21C show the spherical aberration, astigmatism, and distortion of the zoom lens according to Example 1 at the wide angle end, respectively. FIGS. 22A to 22C show the spherical aberration, astigmatism, and distortion of the zoom lens according to Example 1 at the telephoto end, respectively. Each of the aberration diagrams shows aberration with respect to the F-line (wavelength: 486.13 nm) and the C-line (wavelength: 656.3 nm) using the d-line as a reference wavelength. In the astigmatism diagrams, a solid line indicates aberration in a sagittal direction, and a dotted line indicates aberration in a tangential direction. In addition, FNo. indicates a F number, and ω indicates a half angle of view.

Figure 23A:
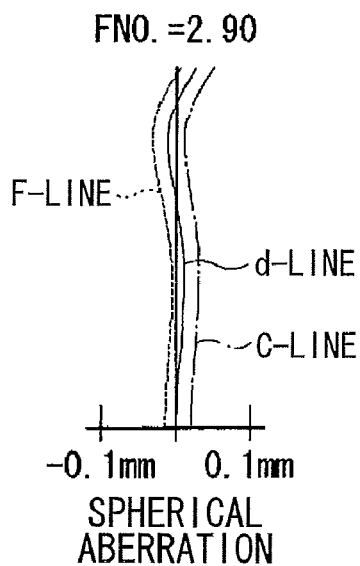
FIG. 23A is a diagram illustrating the spherical aberration of the zoom lens according to Example 2 at the wide angle end.
Figure 23B:
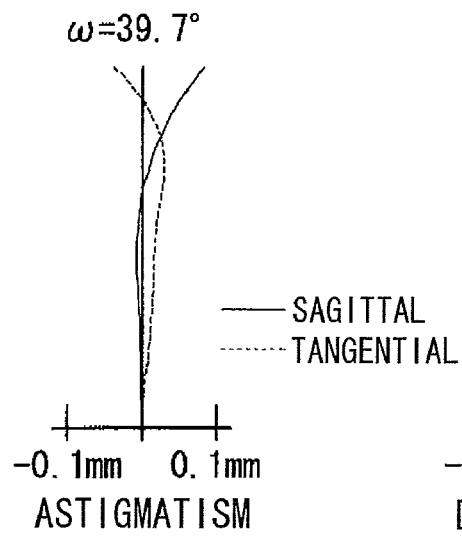
FIG. 23B is a diagram illustrating the astigmatism of the zoom lens according to Example 2 at the wide angle end.
Figure 23C:
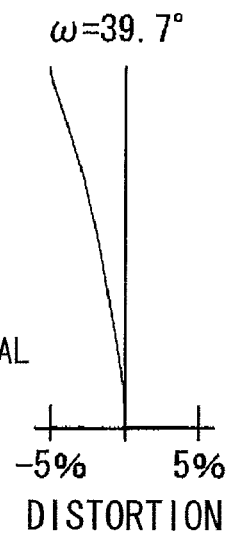
FIG. 23C is a diagram illustrating the distortion of the zoom lens according to Example 2 at the wide angle end.
Figure 24A:
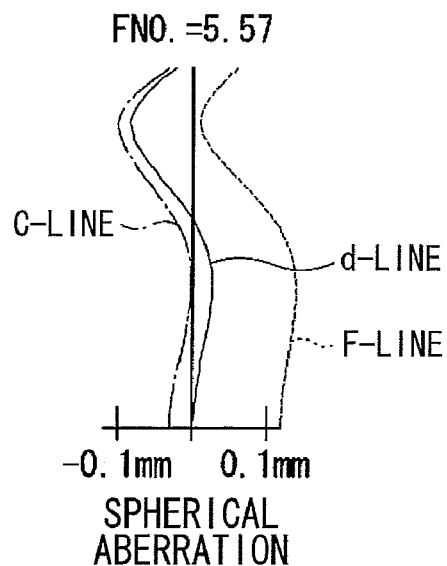
FIG. 24A is a diagram illustrating the spherical aberration of the zoom lens according to Example 2 at the telephoto end.
Figure 24B:
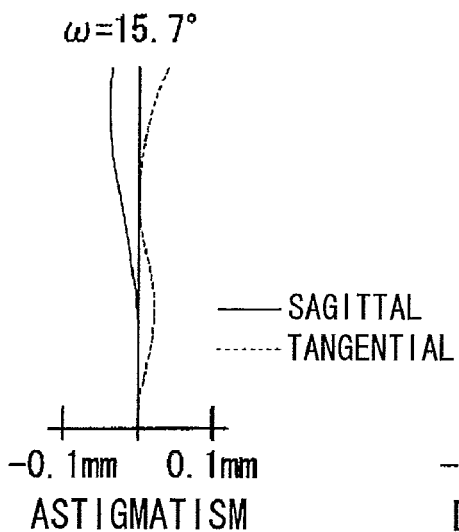
FIG. 24B is a diagram illustrating the astigmatism of the zoom lens according to Example 2 at the telephoto end.
Figure 24C:
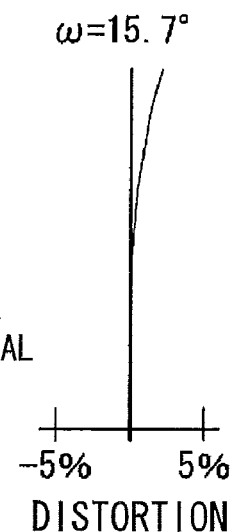
FIG. 24C is a diagram illustrating the distortion of the zoom lens according to Example 2 at the telephoto end.
Figure 25A:
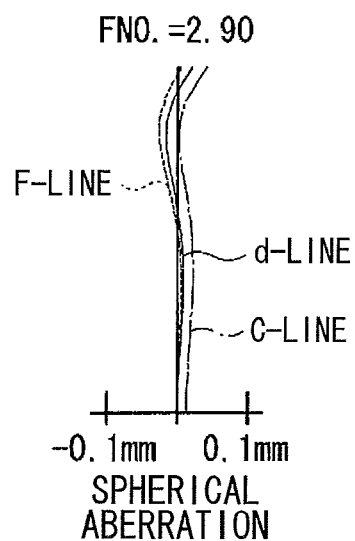
FIG. 25A is a diagram illustrating the spherical aberration of the zoom lens according to Example 3 at the wide angle end.
Figure 25B:
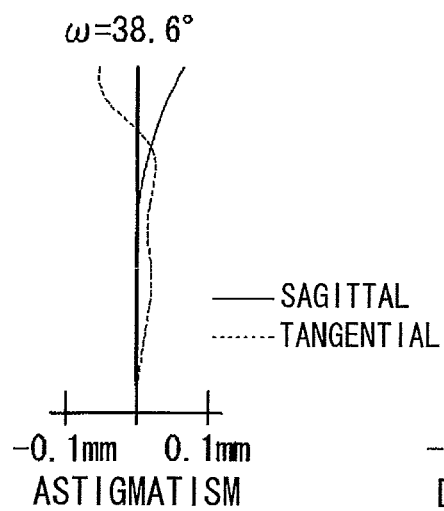
FIG. 25B is a diagram illustrating the astigmatism of the zoom lens according to Example 3 at the wide angle end.
Figure 25C:
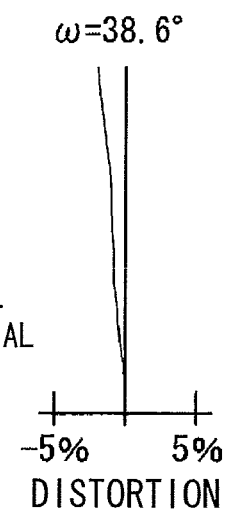
FIG. 25C is a diagram illustrating the distortion of the zoom lens according to Example 3 at the wide angle end.
Figure 26A:
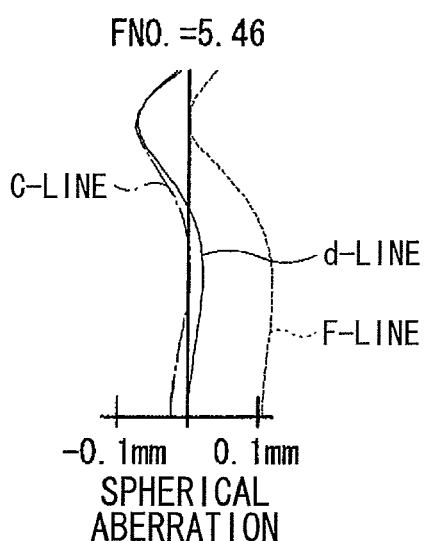
FIG. 26A is a diagram illustrating the spherical aberration of the zoom lens according to Example 3 at the telephoto end.
Figure 26B:
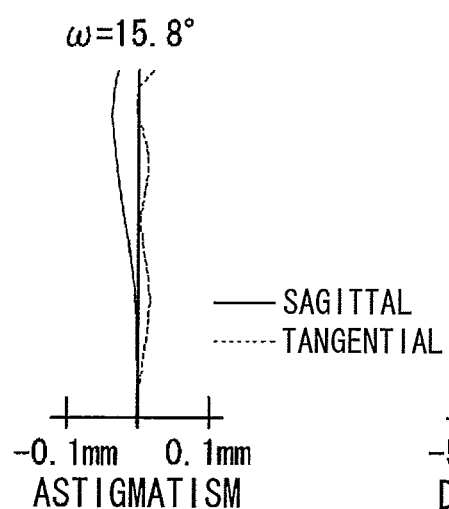
FIG. 26B is a diagram illustrating the astigmatism of the zoom lens according to Example 3 at the telephoto end.
Figure 26C:
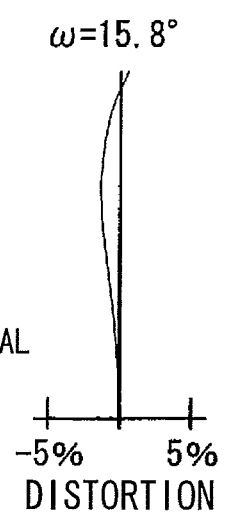
FIG. 26C is a diagram illustrating the distortion of the zoom lens according to Example 3 at the telephoto end.
Figure 27A:
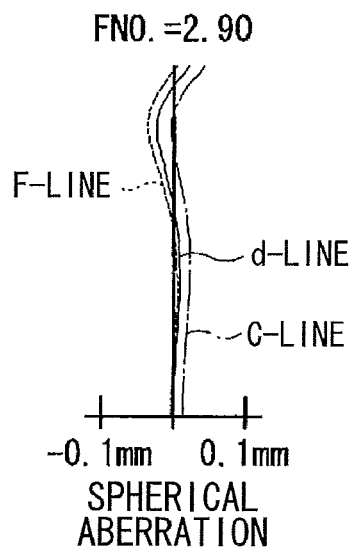
FIG. 27A is a diagram illustrating the spherical aberration of the zoom lens according to Example 4 at the wide angle end.
Figure 27B:
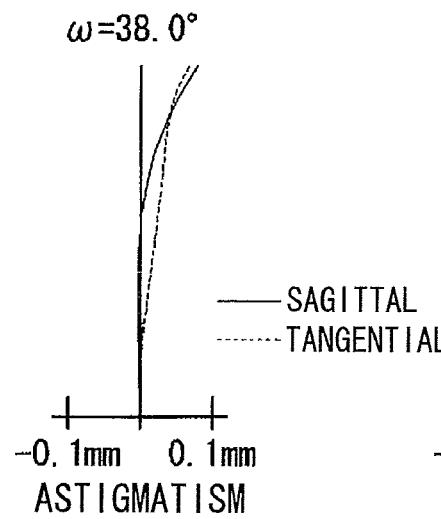
FIG. 27B is a diagram illustrating the astigmatism of the zoom lens according to Example 4 at the wide angle end.
Figure 27C:
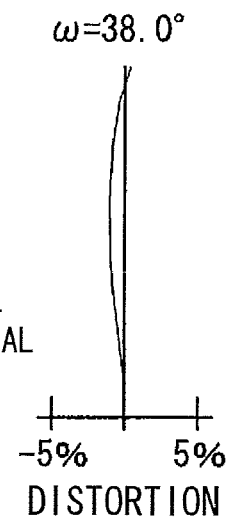
FIG. 27C is a diagram illustrating the distortion of the zoom lens according to Example 4 at the wide angle end.
Figure 28A:
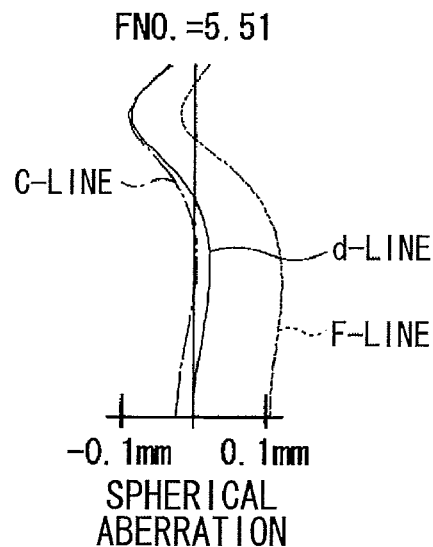
FIG. 28A is a diagram illustrating the spherical aberration of the zoom lens according to Example 4 at the telephoto end.
Figure 28B:
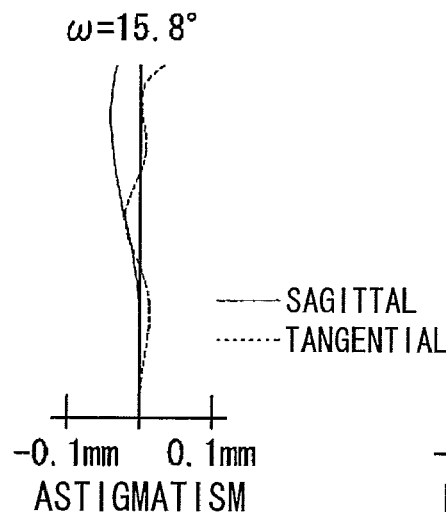
FIG. 28B is a diagram illustrating the astigmatism of the zoom lens according to Example 4 at the telephoto end.
Figure 28C:
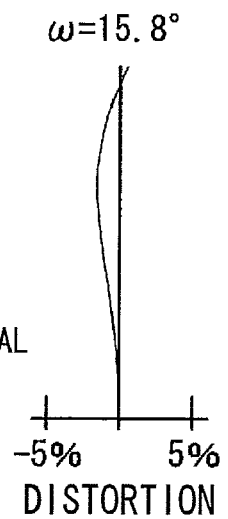
FIG. 28C is a diagram illustrating the distortion of the zoom lens according to Example 4 at the telephoto end.
Figure 29A:
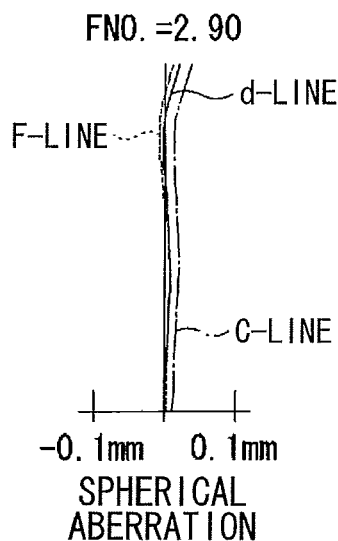
FIG. 29A is a diagram illustrating the spherical aberration of the zoom lens according to Example 5 at the wide angle end.
Figure 29B:
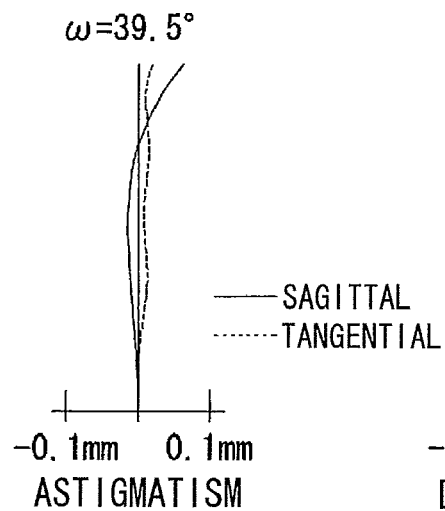
FIG. 29B is a diagram illustrating the astigmatism of the zoom lens according to Example 5 at the wide angle end.
Figure 29C:
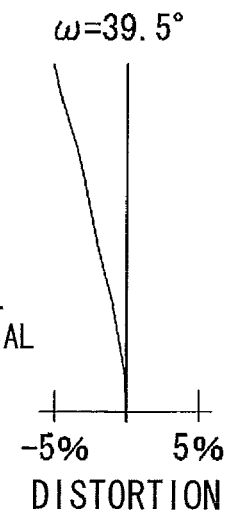
FIG. 29C is a diagram illustrating the distortion of the zoom lens according to Example 5 at the wide angle end.
Figure 30A:
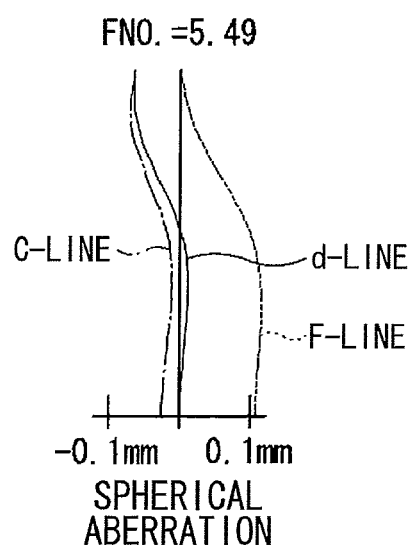
FIG. 30A is a diagram illustrating the spherical aberration of the zoom lens according to Example 5 at the telephoto end.
Figure 30B:
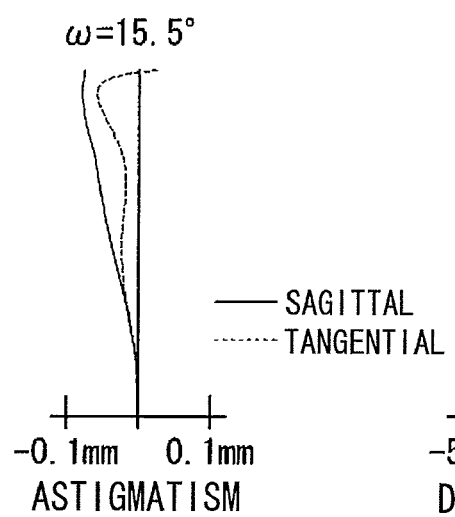
FIG. 30B is a diagram illustrating the astigmatism of the zoom lens according to Example 5 at the telephoto end.
Figure 30C:
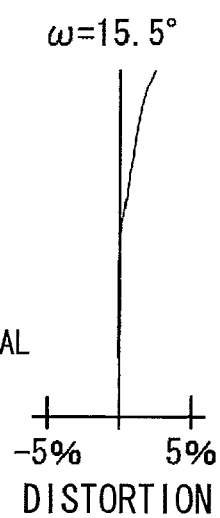
FIG. 30C is a diagram illustrating the distortion of the zoom lens according to Example 5 at the telephoto end.
Figure 31A:
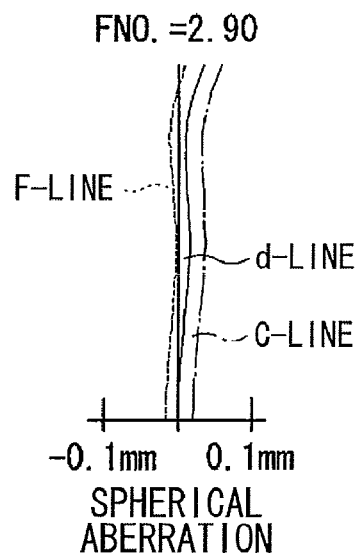
FIG. 31A is a diagram illustrating the spherical aberration of the zoom lens according to Example 6 at the wide angle end.
Figure 31B:
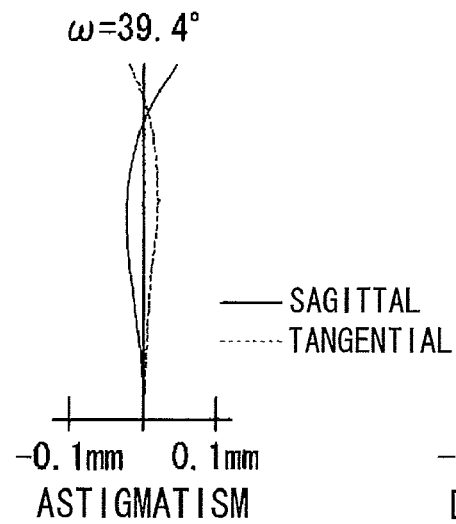
FIG. 31B is a diagram illustrating the astigmatism of the zoom lens according to Example 6 at the wide angle end.
Figure 31C:
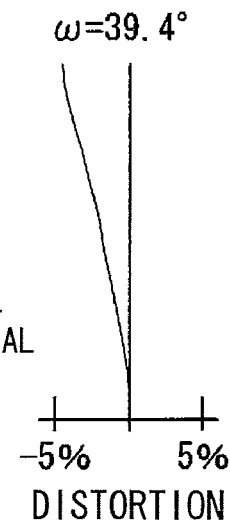
FIG. 31C is a diagram illustrating the distortion of the zoom lens according to Example 6 at the wide angle end.
Figure 32A:
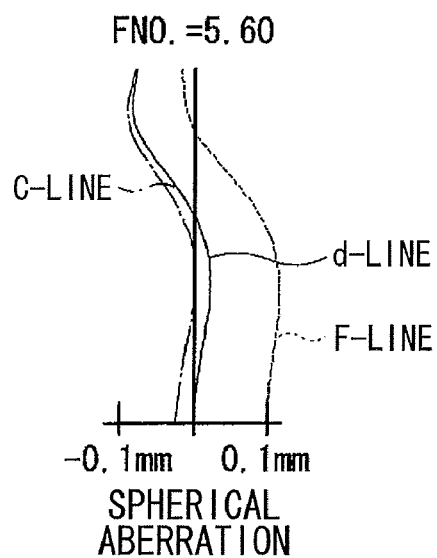
FIG. 32A is a diagram illustrating the spherical aberration of the zoom lens according to Example 6 at the telephoto end.
Figure 32B:
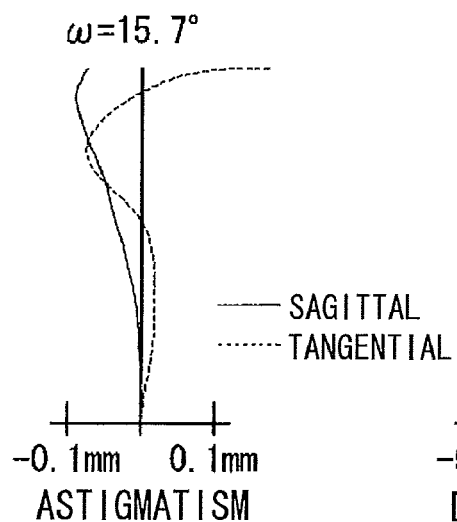
FIG. 32B is a diagram illustrating the astigmatism of the zoom lens according to Example 6 at the telephoto end.
Figure 32C:
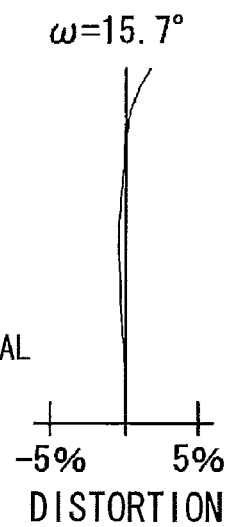
FIG. 32C is a diagram illustrating the distortion of the zoom lens according to Example 6 at the telephoto end.

Similarly, FIGS. 23A to 23C (wide angle end) and FIGS. 24A to 24C (telephoto end) show all aberrations of the zoom lens according to Example 2. Similarly, FIGS. 25A to 32C show all aberrations of the zoom lenses according to Examples 3 to 6.

As can be seen from the numerical data and the aberration diagrams, in all of Examples 1 to 6, it is possible to achieve a zoom lens capable of effectively correcting all aberrations, increasing an angle of view, and reducing the total length thereof, as compared to the bending-type zoom lens according to the related art.

Although the embodiments and examples of the invention have been described above, the invention is not limited thereto. Various modifications and changes of the invention can be made without departing from the scope and spirit of the invention. For example, the curvature radius, the surface spacing, and the refractive index of each lens component are not limited to the values described in the above-mentioned numerical examples, but they may have other values.

What is claimed is:

1. A zoom lens comprising:
   a first lens group that has a negative refractive power and is fixed during zooming;
   a second lens group that includes a prism which has no refractive power, is fixed during zooming, and deflects an optical path;
   a third lens group that has a positive refractive power and is moved during zooming;
   a fourth lens group that has a negative refractive power and is moved during zooming; and
   a fifth lens group that has a positive refractive power and is fixed during zooming,
   wherein the first to fifth lens groups are arranged in this order from an object side, and
   the first lens group consists of a first negative lens having a concave surface facing the object side near an optical axis and a second negative lens having a concave surface facing an image side near the optical axis arranged in this order from the object side.

2. The zoom lens according to claim 1,
   wherein the zoom lens satisfies the following conditional expression:

$0 < f12/f11 < 1.0$ where f11 indicates the focal length of the first negative lens in the first lens group, and f12 indicates the focal length of the second negative lens in the first lens group.

3. The zoom lens according to claim 1,
   wherein the zoom lens satisfies the following conditional expression:

$-1.5 < f3/f4 < -0.5$ where f3 indicates the focal length of the third lens group, and f4 indicates the focal length of the fourth lens group.

4. The zoom lens according to claim 1,
   wherein the zoom lens satisfies the following conditional expression:

$0.7 < Himg/fw$ where fw indicates the focal length of the entire system at a wide angle end, and Himg indicates the largest image height.

5. The zoom lens according to claim 1,
   wherein the first negative lens of the first lens group includes an object-side surface that has a concave shape near the optical axis and has an aspheric shape in the periphery thereof such that the periphery has a negative power or a positive power lower than that near the optical axis, and an image-side surface that has a convex shape near the optical axis and has an aspheric shape in the periphery such that the periphery has a positive power or a negative power lower than that near the optical axis,
   the third lens group includes at least one positive lens having a convex surface facing the object side,
   the fourth lens group includes a cemented lens, and
   the fifth lens group includes one positive aspheric lens having a convex surface facing the image side.

6. The zoom lens according to claim 5,
   wherein the zoom lens satisfies the following conditional expression:

$50 < vG3$ where vG3 indicates the average value of the Abbe numbers of the lenses in the third lens group.

7. The zoom lens according to claim 5,
   wherein the fourth lens group includes a cemented lens of two lenses, and one aspheric lens arranged in this order from the object side.

8. The zoom lens according to claim 5,
   wherein the third lens group includes a positive aspheric lens having aspheric surfaces at both sides and a positive spherical lens having spherical surfaces at both sides arranged in this order from the object side.

9. An imaging apparatus comprising:
   the zoom lens according to claim 1; and
   an imaging device that outputs an image signal corresponding to an optical image formed by the zoom lens.

10. A mobile phone comprising:
    the zoom lens according to claim 1; and
    an imaging device that outputs an image signal corresponding to an optical image formed by the zoom lens.

11. The mobile phone according to claim 10, further comprising:
    a case having a rectangular surface,
    wherein the zoom lens is arranged in the case such that an optical axis after an optical path is deflected is aligned with the lateral direction of the case.

12. A zoom lens comprising:
    a first lens group that has a negative refractive power and is fixed during zooming;
    a second lens group that includes a prism which has no refractive power, is fixed during zooming, and deflects an optical path;
    a third lens group that has a positive refractive power and is moved during zooming;
    a fourth lens group that has a negative refractive power and is moved during zooming; and
    a fifth lens group that has a positive refractive power and is fixed during zooming,
    wherein the first to fifth lens groups are arranged in this order from an object side, and
    the first lens group includes a first negative lens having a concave surface facing the object side near an optical axis and a second negative lens having a concave surface facing an image side near the optical axis arranged in this order from the object side, and
    wherein the first negative lens of the first lens group includes an object-side surface that has a concave shape near the optical axis and has an aspheric shape in the periphery thereof such that the periphery has a negative power or a positive power lower than that near the optical axis, and an image-side surface that has a convex shape near the optical axis and has an aspheric shape in the periphery such that the periphery has a positive power or a negative power lower than that near the optical axis,
    the third lens group includes at least one positive lens having a convex surface facing the object side,
    the fourth lens group includes a cemented lens, and
    the fifth lens group includes one positive aspheric lens having a convex surface facing the image side.

* * * * *